US012733021B2

(12) United States Patent
Kim et al.

(10) Patent No.: US 12,733,021 B2
(45) Date of Patent: Sep. 8, 2026

(54) METHOD AND DEVICE FOR TRANSMITTING/RECEIVING SIGNAL BETWEEN TERMINALS BASED ON SIDELINK COMMUNICATION IN WIRELESS COMMUNICATION SYSTEM

(71) Applicant: LG ELECTRONICS INC., Seoul (KR)

(72) Inventors: Hyunmin Kim, Seoul (KR); Chang Soo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 517 days.

(21) Appl. No.: 17/919,349

(22) PCT Filed: Apr. 21, 2021

(86) PCT No.: PCT/KR2021/005029
§ 371 (c)(1),
(2) Date: Oct. 17, 2022

(87) PCT Pub. No.: WO2021/215826
PCT Pub. Date: Oct. 28, 2021

(65) Prior Publication Data

US 2023/0171793 A1 Jun. 1, 2023

(30) Foreign Application Priority Data

Apr. 21, 2020 (KR) ........................ 10-2020-0047953
Jun. 18, 2020 (KR) ........................ 10-2020-0074365

(51) Int. Cl.
*H04W 72/40* (2023.01)
*H04L 1/1829* (2023.01)
(Continued)

(52) U.S. Cl.
CPC ........... *H04W 72/40* (2023.01); *H04L 1/1854* (2013.01); *H04W 56/001* (2013.01); *H04W 72/232* (2023.01)

(58) Field of Classification Search
CPC . H04W 72/40; H04W 56/001; H04W 72/232; H04L 1/1854
See application file for complete search history.

(56) References Cited

U.S. PATENT DOCUMENTS

2017/0295601 A1* 10/2017 Kim ...................... H04W 72/20
2020/0099476 A1* 3/2020 Park ...................... H04W 4/70
(Continued)

FOREIGN PATENT DOCUMENTS

KR 10-2014-0060232 A 5/2014
WO 2020/056560 A1 3/2020
WO 2020/068973 A1 4/2020

OTHER PUBLICATIONS

Samsung, "Considerations on Sidelink HARQ Procedure", R1-1902278, 3GPP TSG RAN WG1 #96, Athens, Greece, Feb. 25-Mar. 1, 2019, see sections 2-3; and figures 1-2b.
(Continued)

*Primary Examiner* — Jackie Zuniga Abad
(74) *Attorney, Agent, or Firm* — BRYAN CAVE LEIGHTON PAISNER LLP

(57) ABSTRACT

Provided is a method for receiving a signal by a terminal in a wireless communication system, the method comprising: receiving first data from a first transmission terminal and determining a HARQ feedback transmission time for the first data; receiving second data from a second transmission terminal and determining a HARQ feedback transmission time for the second data, wherein the first transmission terminal is aligned with the reception terminal by a first beam and the second transmission terminal is aligned with the reception terminal by a second beam; and based on the
(Continued)

HARQ feedback transmission time for the first data and the HARQ feedback transmission time for the second data being identical with each other, modifying the HARQ feedback transmission time for the first data and transmitting, to the first transmission terminal, a negotiation message for indicating the HARQ feedback transmission time modification.

14 Claims, 36 Drawing Sheets

(51) Int. Cl.
*H04W 56/00* (2009.01)
*H04W 72/232* (2023.01)

(56) References Cited

U.S. PATENT DOCUMENTS

2020/0220669 A1* 7/2020 Park ...................... H04L 1/1861
2020/0296796 A1* 9/2020 Uchiyama ............. H04W 72/02
2021/0377912 A1* 12/2021 El Hamss ............. H04L 1/1854

OTHER PUBLICATIONS

Huawei et al., Sidelink physical layer procedures for NR V2X, R1-1906008, 3GPP TSG RAN WG1 Meeting #97, Reno, USA, May 13-17, 2019, see sections 2-3.

* cited by examiner (a)

Figure 34:
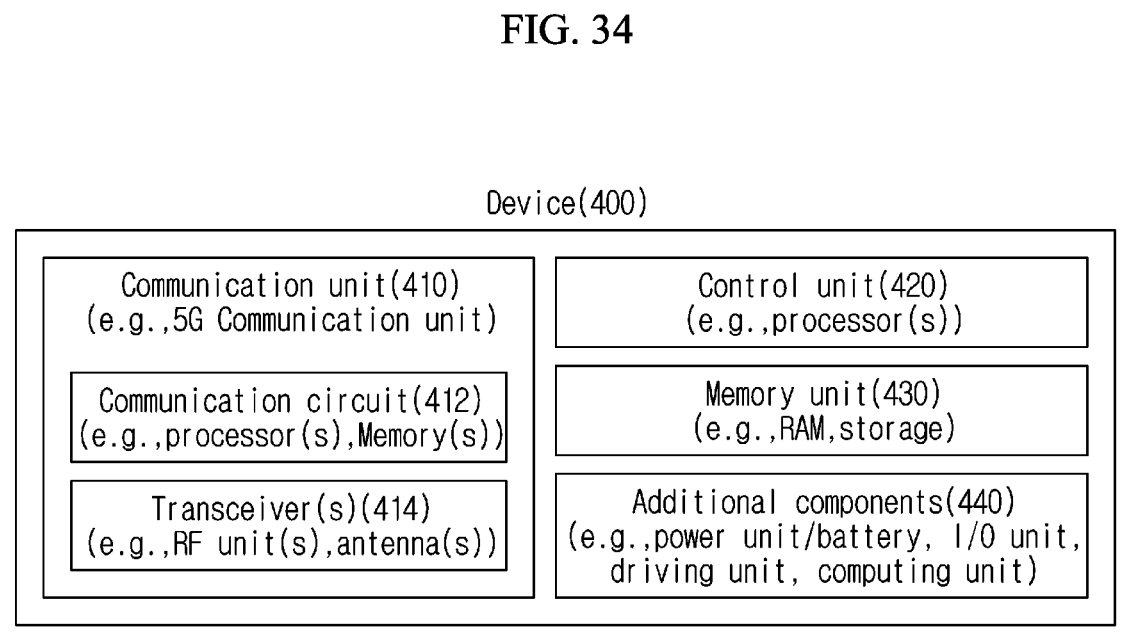

Device(400)

Communication unit(410)
(e.g.,5G Communication unit)

Communication circuit(412)
(e.g.,processor(s),Memory(s))

Transceiver(s)(414)
(e.g.,RF unit(s),antenna(s))

Control unit(420)
(e.g.,processor(s))

Memory unit(430)
(e.g.,RAM,storage)

Additional components(440)
(e.g.,power unit/battery, I/O unit, driving unit, computing unit)

METHOD AND DEVICE FOR TRANSMITTING/RECEIVING SIGNAL BETWEEN TERMINALS BASED ON SIDELINK COMMUNICATION IN WIRELESS COMMUNICATION SYSTEM

CROSS REFERENCE TO RELATED APPLICATION

This application is the National Stage filing under 35 U.S.C. 371 of International Application No. PCT/KR2021/005029, filed on Apr. 21, 2021, which claims the benefit of and priority to Korean Application No. 10-2020-0047953, filed on Apr. 21, 2020 and Korean Application No. 10-2020-0074365, filed on Jun. 18, 2020, the contents of which are all hereby incorporated by reference herein in their entirety.

BACKGROUND OF THE INVENTION

Field of the Invention

The present disclosure relates to a wireless communication system, and more particularly, to a method and apparatus for transmitting and receiving a signal in a wireless communication system.

Especially, the present disclosure relates to a method and apparatus for transmitting and receiving a signal between terminals based on sidelink (SL) communication.

Description of the Related Art

A wireless communication system is a multiple access system that supports communication of multiple users by sharing available system resources (e.g., a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (mMTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

The present disclosure relates to a method and apparatus for transmitting and receiving a signal between terminals in a wireless communication system.

The present disclosure relates to a method for determining a HARQ feedback transmission time, when mmWave beam-based sidelink communication is performed in a wireless communication system.

The present disclosure relates to a method for changing a HARQ feedback transmission time, when HARQ feedbacks collide based on terminal-to-terminal communication in a wireless communication system.

The present disclosure relates to a method for allocating a retransmission resource by a transmission terminal in consideration of a channel environment of a reception terminal in a wireless communication system.

The technical objects to be achieved in the present disclosure are not limited to the above-mentioned technical objects, and other technical objects that are not mentioned may be considered by those skilled in the art through the embodiments described below.

In an embodiment of the present disclosure, a method for receiving a signal by a reception terminal performing sidelink communication in a wireless communication system, the method comprising: receiving first data from a first transmission terminal and determining a hybrid automatic repeat request (HARQ) feedback transmission time for the first data; receiving second data from a second transmission terminal and determining a HARQ feedback transmission time for the second data, wherein the first transmission terminal is aligned with the reception terminal by a first beam and the second transmission terminal is aligned with the reception terminal by a second beam; and based on the HARQ feedback transmission time for the first data and the HARQ feedback transmission time for the second data being identical with each other, modifying the HARQ feedback transmission time for the first data and transmitting, to the first transmission terminal, a negotiation message for indicating the HARQ feedback transmission time modification.

In an embodiment of the present disclosure, a terminal for receiving a signal in a wireless communication system, the terminal comprising: a transceiver; and a processor coupled with the transceiver, wherein the processor is configured to: receive first data from a first transmission terminal and determine a HARQ feedback transmission time for the first data, receive second data from a second transmission terminal and determine a HARQ feedback transmission time for the second data, wherein the first transmission terminal is aligned with the reception terminal by a first beam and the second transmission terminal is aligned with the reception terminal by a second beam, and based on the HARQ feedback transmission time for the first data and the HARQ feedback transmission time for the second data being identical with each other, modify the HARQ feedback transmission time for the first data and transmit, to the first transmission terminal, a negotiation message for indicating the HARQ feedback transmission time modification.

In an embodiment of the present disclosure, a terminal for transmitting a signal in a wireless communication system, the terminal comprising: a transceiver; and a processor coupled with the transceiver, wherein the processor is configured to: transmit first data to a reception terminal, wherein the transmission terminal is aligned with the reception terminal by a first beam, receive, from the reception terminal, a negotiation message for indicating that a HARQ feedback transmission time for the first data is modified, and receive, from the reception terminal, HARQ feedback at a time modified based on the negotiation message, wherein the reception terminal receives second data from another transmission terminal that is aligned by the first beam and, based on the HARQ feedback transmission time for the first data and a HARQ feedback transmission time for the second data being identical with each other, transmits the negotiation message for indicating the HARQ feedback transmission time modification to the transmission terminal.

In an embodiment of the present disclosure, a device comprising at least one memory and at least one processor functionally coupled with the at least one memory, wherein the at least processor controls the device to: receive first data from a first transmission terminal and determine a HARQ feedback transmission time for the first data, receive second data from a second transmission terminal and determine a HARQ feedback transmission time for the second data, wherein the first transmission terminal is aligned with the device by a first beam and the second transmission terminal is aligned with the device by a second beam, and based on the HARQ feedback transmission time for the first data and the HARQ feedback transmission time for the second data being identical with each other, modify the HARQ feedback transmission time for the first data and transmit, to the first transmission terminal, a negotiation message for indicating the HARQ feedback transmission time modification.

In an embodiment of the present disclosure, a non-transitory computer-readable medium storing at least one instruction, comprising the at least one instruction that is executable by a processor, wherein the at least one instruction instructs a device to: receive first data from a first transmission terminal and determine a HARQ feedback transmission time for the first data, receive second data from a second transmission terminal and determine a HARQ feedback transmission time for the second data, wherein the first transmission terminal is aligned with the device by a first beam and the second transmission terminal is aligned with the device by a second beam, and based on the HARQ feedback transmission time for the first data and the HARQ feedback transmission time for the second data being identical with each other, modify the HARQ feedback transmission time for the first data and transmit, to the first transmission terminal, a negotiation message for indicating the HARQ feedback transmission time modification.

In an embodiment of the present disclosure, the HARQ feedback transmission times for the first transmission terminal and the second transmission terminal respectively are determined based on resource pool information and physical sidelink feedback channel (PSFCH) configuration information of a radio resource control (RRC) layer setting.

In an embodiment of the present disclosure, the reception terminal receives first sidelink control information (SCI) together with the first data from the first transmission terminal and receives second SCI together with the second data from the second transmission terminal, and wherein a negotiation flag field is included in each of the first SCI and the second SCI.

In an embodiment of the present disclosure, based on the negotiation flag field being a first value, the negotiation flag field indicates that HARQ feedback transmission time modification is possible, and based on the negotiation flag field being a second value, the negotiation flag field indicates that HARQ feedback transmission time modification is impossible.

In an embodiment of the present disclosure, the negotiation flag field of the first SCI is set to the first value, and the negotiation flag field of the second SCI is set to the second value.

In an embodiment of the present disclosure, based on both the negotiation flag field of the first SCI and the negotiation flag field of the second SCI being set to the second value, the reception terminal modifies the HARQ feedback transmission time for the first data with a lower priority based on a priority order for the first data and the second data.

In an embodiment of the present disclosure, the reception terminal transmits the negotiation message through a resource that is preconfigured based on a RRC layer setting, and wherein the negotiation message is configured to be 1-bit information indicating whether or not the HARQ feedback transmission time is modified.

In an embodiment of the present disclosure, based on the negotiation message indicating the HARQ feedback transmission time modification for the first data, the HARQ feedback transmission time for the first data is transmitted one slot before a determined HARQ feedback transmission time.

In an embodiment of the present disclosure, a method for transmitting a signal by a transmission terminal performing sidelink communication in a wireless communication system, the method comprising: transmitting first data to a reception terminal, wherein the transmission terminal is aligned with the reception terminal by a first beam; receiving, from the reception terminal, a negotiation message for indicating that a HARQ feedback transmission time for the first data is modified; and receiving, from the reception terminal, HARQ feedback at a time modified based on the negotiation message, wherein the reception terminal receives second data from another transmission terminal that is aligned by the first beam and, based on the HARQ feedback transmission time for the first data and a HARQ feedback transmission time for the second data being identical with each other, transmits the negotiation message for indicating the HARQ feedback transmission time modification to the transmission terminal.

In an embodiment of the present disclosure, the HARQ feedback transmission time of the transmission terminal is determined based on resource pool information and PSFCH configuration information of a RRC layer setting.

In an embodiment of the present disclosure, the transmission terminal transmits first SCI together with the first data to the reception terminal, and a negotiation flag field is included in the first SCI.

In an embodiment of the present disclosure, based on the negotiation flag field being a first value, the negotiation flag field indicates that HARQ feedback transmission time modification is possible, and wherein, based on the negotiation flag field being a second value, the negotiation flag field indicates that HARQ feedback transmission time modification is impossible.

In an embodiment of the present disclosure, the negotiation flag field of the first SCI is set to the first value.

In an embodiment of the present disclosure, the transmission terminal receives the negotiation message through a resource that is preconfigured based on a RRC layer setting, and wherein the negotiation message is configured to be 1-bit information indicating whether or not the HARQ feedback transmission time is modified.

In an embodiment of the present disclosure, based on the negotiation message indicating the HARQ feedback transmission time modification for the first data, the HARQ feedback transmission time for the first data is transmitted one slot before a determined HARQ feedback transmission time.

The following effects may be produced by embodiments based on the present disclosure.

According to the present disclosure, the present disclosure may provide a method for transmitting and receiving a signal between terminals in a wireless communication system.

The present disclosure may solve the problem of colliding HARQ feedback transmission times, when mmWave beam-based sidelink communication is performed in a wireless communication system.

The present disclosure may ensure reliable transmission by changing a HARQ feedback transmission time, when HARQ feedbacks collide based on terminal-to-terminal communication in a wireless communication system.

The present disclosure may enhance transmission reliability and reduce latency by allocating a retransmission resource by a transmission terminal in consideration of a channel environment of a reception terminal in a wireless communication system.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

FIG. 34 illustrates another example of a wireless device according to an embodiment of the present disclosure.

DETAILED DESCRIPTION OF THE INVENTION

Figure 1:
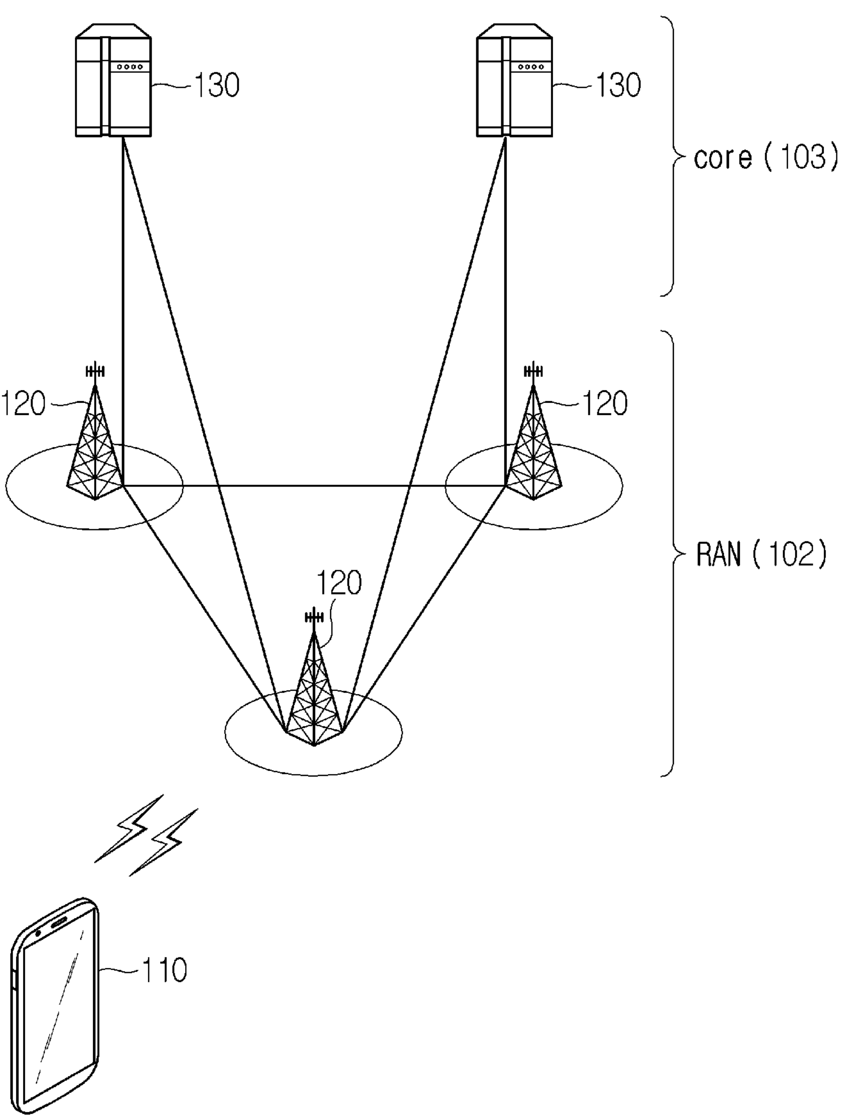
FIG. 1 illustrates a structure of a wireless communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information"

In the following description, 'when, if', or in case of may be replaced with 'based on'.

A technical feature described individually in one figure in the present specification may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the following document may be referred to.

(1) 3GPP LTE

3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol (2) 3GPP NR (e.g. 5G)

3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: Overall description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description Communication System Applicable to the Present Disclosure FIG. 1 illustrates a structure of a wireless communication system according to an embodiment of the present disclosure. The embodiment of FIG. 1 may be combined with various embodiments of the present disclosure.

Referring to FIG. 1, a wireless communication system includes a radio access network (RAN) 102 and a core network 103. The radio access network 102 includes a base station 120 that provides a control plane and a user plane to a terminal 110. The terminal 110 may be fixed or mobile, and may be called other terms such as a user equipment (UE), a mobile station (MS), a subscriber station (SS), a mobile subscriber station (MSS), a mobile terminal, an advanced mobile station (AMS), or a wireless device. The base station 120 refers to a node that provides a radio access service to the terminal 110, and may be called other terms such as a fixed station, a Node B, an eNB (eNode B), a gNB (gNode B), an ng-eNB, an advanced base station (ABS), an access point, a base transceiver system (BTS), or an access point (AP). The core network 103 includes a core network entity 130. The core network entity 130 may be defined in various ways according to functions, and may be called other terms such as a core network node, a network node, or a network equipment.

Components of a system may be referred to differently according to an applied system standard. In the case of the LTE or LTE-A standard, the radio access network 102 may be referred to as an Evolved-UMTS Terrestrial Radio Access Network (E-UTRAN), and the core network 103 may be referred to as an evolved packet core (EPC). In this case, the core network 103 includes a Mobility Management Entity (MME), a Serving Gateway (S-GW), and a packet data network-gateway (P-GW). The MME has access information of the terminal or information on the capability of the terminal, and this information is mainly used for mobility management of the terminal. The S-GW is a gateway having an E-UTRAN as an endpoint, and the P-GW is a gateway having a packet data network (PDN) as an endpoint.

In the case of the 5G NR standard, the radio access network 102 may be referred to as an NG-RAN, and the core network 103 may be referred to as a 5GC (5G core). In this case, the core network 103 includes an access and mobility management function (AMF), a user plane function (UPF), and a session management function (SMF). The AMF provides a function for access and mobility management in units of terminals, the UPF performs a function of mutually transmitting data units between an upper data network and the radio access network 102, and the SMF provides a session management function.

The BSs 120 may be connected to one another via Xn interface. The BS 120 may be connected to one another via core network 103 and NG interface. More specifically, the BSs 130 may be connected to an access and mobility management function (AMF) via NG-C interface, and may be connected to a user plane function (UPF) via NG-U interface.

Figure 2:
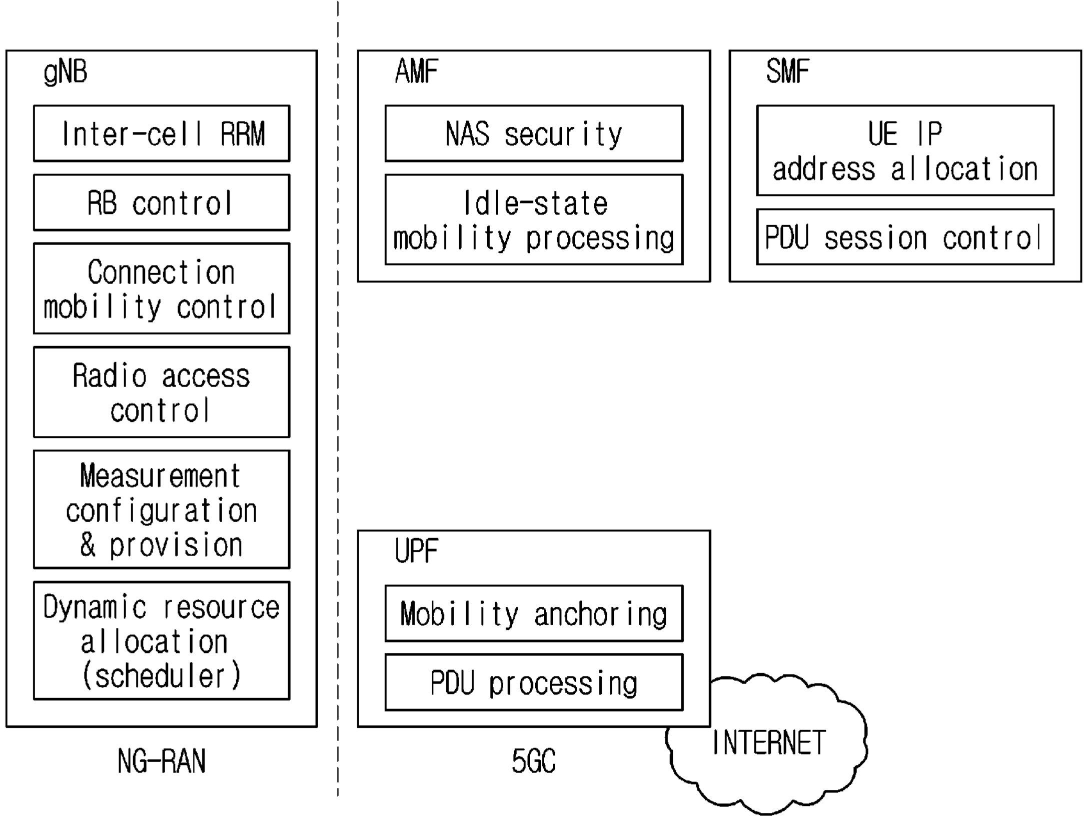
FIG. 2 illustrates a functional division between an NG-RAN and a SGC applicable to the present disclosure.

FIG. 2 illustrates a functional division between an NG-RAN and a 5GC applicable to the present disclosure. The embodiment of FIG. 2 may be combined with various embodiments of the present disclosure.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer enable to exchange an RRC message between the UE and the BS.

Figure 3A:
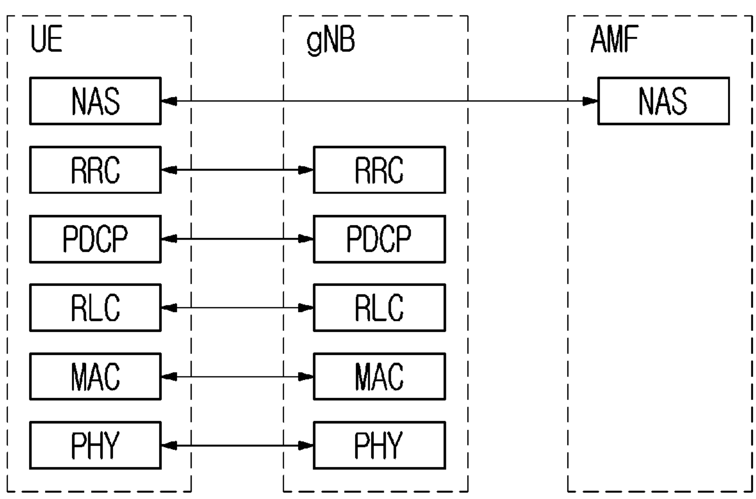
FIG. 3 illustrates a radio protocol architecture applicable to the present disclosure.
Figure 3B:
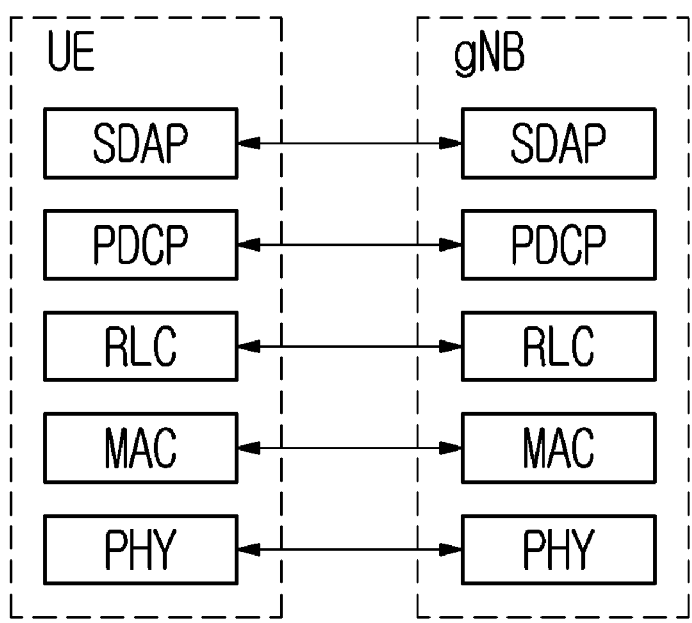

FIGS. 3A and 3B illustrate a radio protocol architecture applicable to the present disclosure. The embodiment of FIG. 3 may be combined with various embodiments of the present disclosure. Specifically, FIG. 3A exemplifies a radio protocol architecture for a user plane, and FIG. 3B exemplifies a radio protocol architecture for a control plane. The user plane corresponds to a protocol stack for user data transmission, and the control plane corresponds to a protocol stack for control signal transmission.

Referring to FIGS. 3A and 3B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PI-TY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Radio Resource Structure

Figure 4:
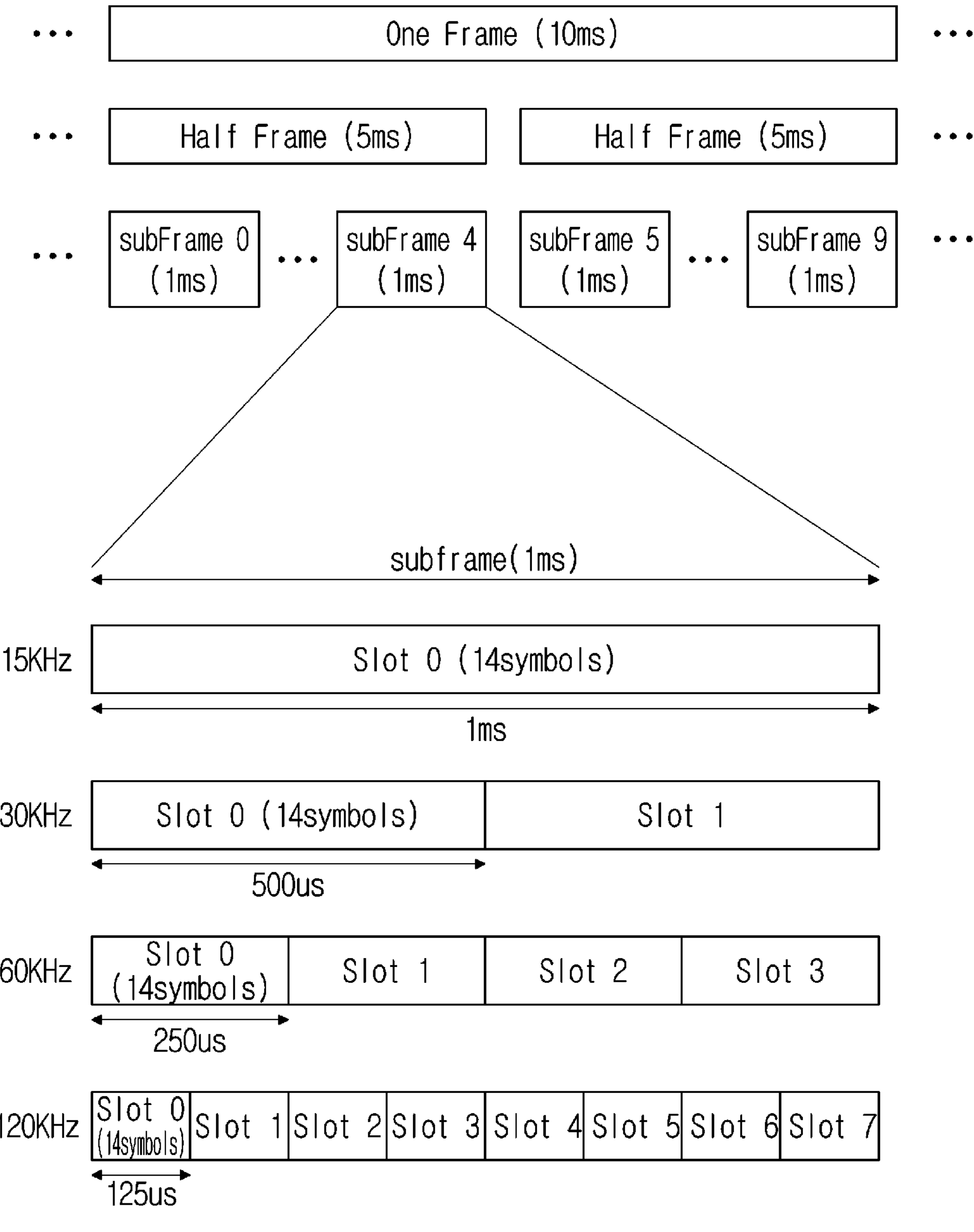
FIG. 4 illustrates a structure of a radio frame in an NR system applicable to the present disclosure.

FIG. 4 illustrates a structure of a radio frame in an NR system applicable to the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

In a case where a normal CP is used, a number of symbols per slot ($N^{slot}_{symb}$), a number slots per frame ($N^{frame,\mu}_{slot}$), and a number of slots per subframe ($N^{frame,\mu}_{slot}$) may be varied based on an SCS configuration (μ). For instance, SCS (=15*$2^{\mu}$), $N^{slot}_{symb}$, $N^{frame,\mu}_{slot}$ and $N^{frame,\mu}_{slot}$ are 15 KHz, 14, 10 and 1, respectively, when μ=0, are 30 KHz, 14, 20 and 2, respectively, when μ=1, are 60 KHz, 14, 40 and 4, respectively, when μ=2, are 120 KHz, 14, 80 and 8, respectively, when μ=3, or are 240 KHz, 14, 160 and 16, respectively, when μ=4. Meanwhile, in a case where an extended CP is used, SCS (=15*$2^{\mu}$), $N^{slot}_{symb}$, $N^{frame,\mu}$ and $N^{subframe,\mu}$ are 60 $KH_z$, 12, 40 and 2, respectively, when μ=2.

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, frequency ranges corresponding to the FR1 and FR2 may be 450 MHz-6000 MHz and 24250 MHz-52600 MHz, respectively. Further, supportable SCSs is 15, 30 and 60 kHz for the FR1 and 60, 120, 240 kHz for the FR2. Among the frequency ranges that are used in an NR system, FR1 may mean a "sub 6 GHz range", and FR2 may mean an "above 6 GHz range" and may also be referred to as a millimeter wave (mmW).

As described above, the values of the frequency ranges in the NR system may be changed (or varied). For example, comparing to examples for the frequency ranges described above, FR1 may be defined to include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

Figure 5:
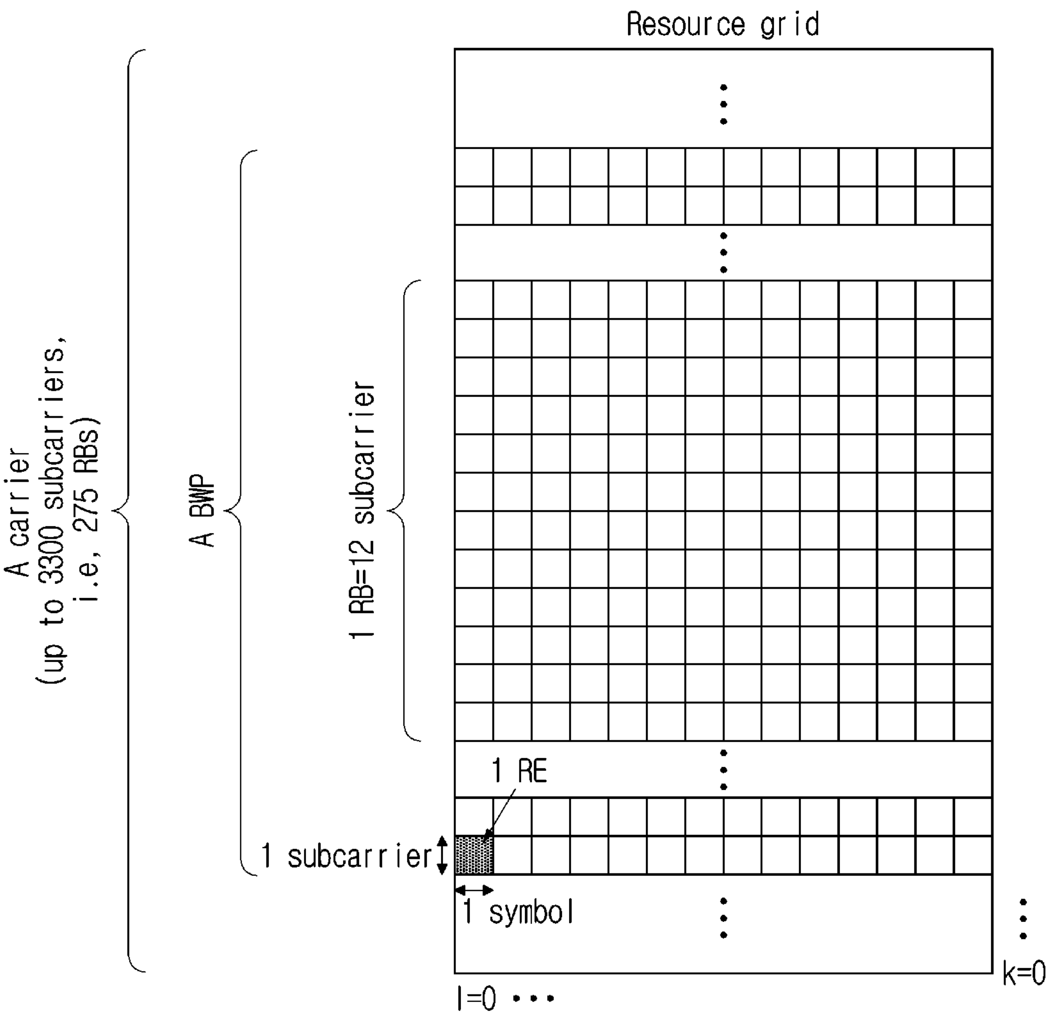
FIG. 5 illustrates a structure of a slot in an NR frame applicable to the present disclosure.

FIG. 5 illustrates a structure of a slot of an NR frame applicable to the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Bandwidth Part (BWP)

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit a Physical Uplink Control Channel (PUCCH) or a Physical Uplink Shared Channel (PUSCH) outside an active UL BWP. For example, in a downlink case, the initial BWP may be given as a consecutive RB set for a remaining minimum system information (RMSI) control resource set (CORESET) (configured by PBCH). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
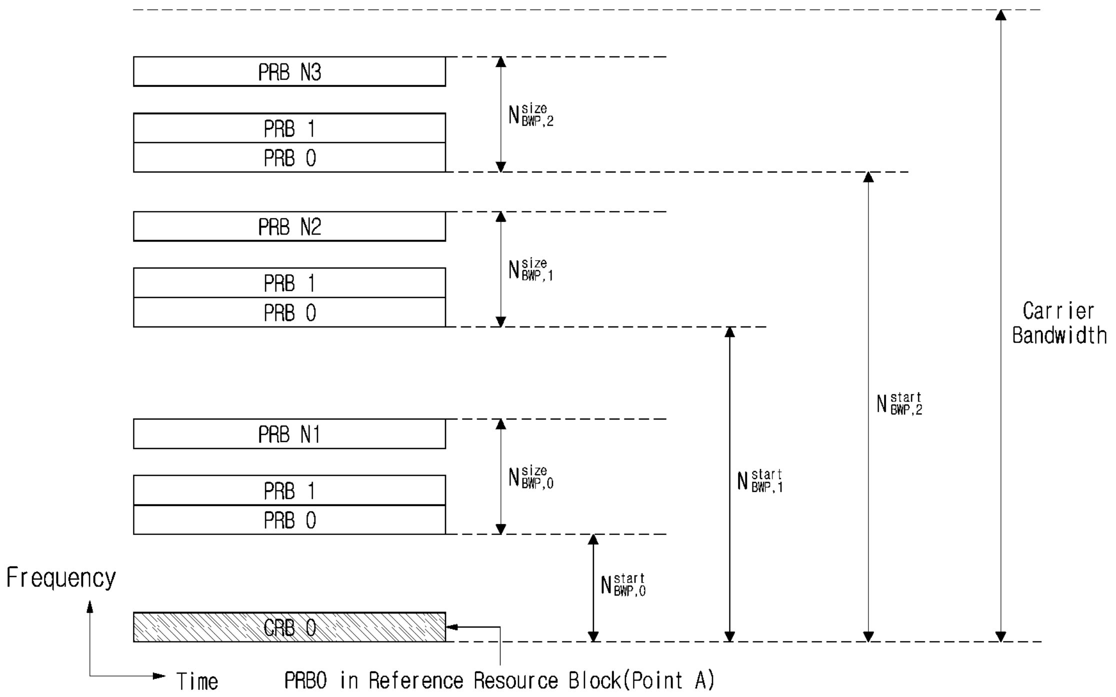
FIG. 6 illustrates an example of a BWP applicable to the present disclosure.

FIG. 6 illustrates an example of a BWP applicable to the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset ($N^{Start}_{BWP}$) from the point A, and a bandwidth ($N^{Size}_{BWP}$). For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

V2X or Sidelink Communication

Figure 7A:
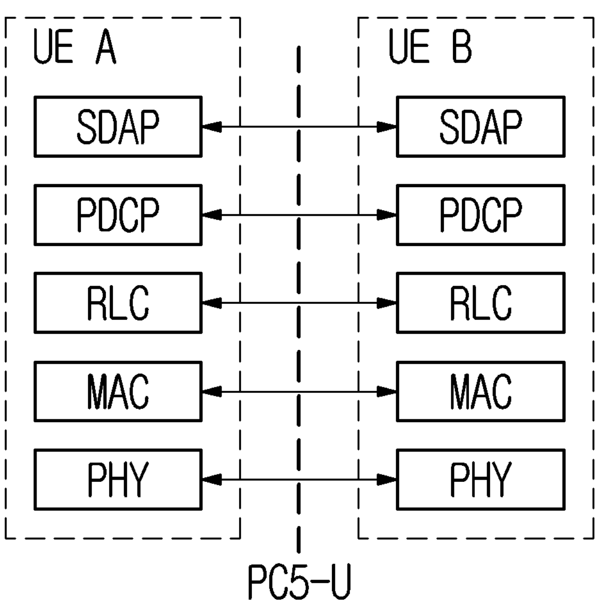
FIGS. 7A and 7B illustrate a radio protocol architecture for a SL communication applicable to the present disclosure.
Figure 7B:
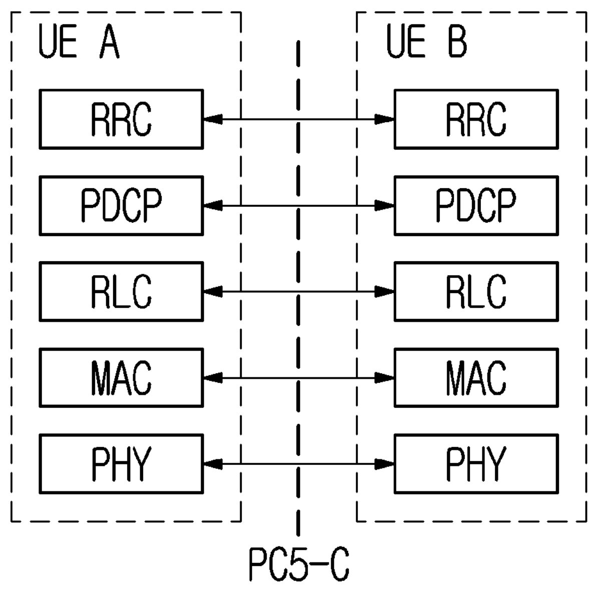

FIGS. 7A and 7B illustrate a radio protocol architecture for a SL communication applicable to the present disclosure. The embodiment of FIGS. 7A and 7B may be combined with various embodiments of the present disclosure. More specifically, FIG. 7A exemplifies a user plane protocol stack, and FIG. 7B exemplifies a control plane protocol stack.

Sidelink Synchronization Signal (SLSS) and Synchronization Information

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

For example, based on Table 1, the UE may generate an S-SS/PSBCH block (i.e., S-SSB), and the UE may transmit the S-SS/PSBCH block (i.e., S-SSB) by mapping it on a physical resource.

TABLE 1

■ Time-frequency structure of an S-SS/PSBCH block

In the time domain, an S-SS/PSBCH block consists of $N_{symb}^{S\text{-}SSB}$ OFDM symbols, numbered in increasing order from 0 to $N_{symb}^{S\text{-}SSB} - 1$ within the S-SS/PSBCH block, where S-PSS, S-SSS, and PSBCH with associated DM-RS are mapped to symbols as given by Table 8.4.3.1-1.

The number of OFDM symbols in an S-SS/PSBCH block $N_{symb}^{S\text{-}SSB} = 13$ for normal cyclic prefix and $N_{symb}^{S\text{-}SSB} = 11$ for extended cyclic prefix. The first OFDM symbol in an S-SS/PSBCH block is the first OFDM symbol in the slot.

In the frequency domain, an S-SS/PSBCH block consists of 132 contiguous subcarriers with the subcarriers numbered in increasing order from 0 to 131 within the sidelink S-SS/PSBCH block. The quantities k and l represent the frequency and time indices, respectively, within one sidelink S-SS/PSBCH block.

For an S-SS/PSBCH block, the UE shall use

- antenna port 4000 for transmission of S-PSS, S-SSS, PSBCH and DM-RS for PSBCH:
- the same cyclic prefix length and subcarrier spacing for the S-PSS, S-SSS, PSBCH and DM-RS for PSBCH.

Table 8.4.3.1-1: Resources within an S-SS/PSBCH block for S-PSS, S-SSS, PSBCH, and DM-RS.

| Channel or signal | OFDM symbol number l relative to the start of an S-SS/PSBCH block | Subcarrier number k relative to the start of an S-SS/PSBCH block |
|---|---|---|
| S-PSS | 1, 2 | 2, 3, . . . , 127, 128 |
| S-SSS | 3, 4 | 2, 3, . . . , 127, 128 |
| Set to zero | 1, 2, 3, 4 | 0, 1, 129, 130, 131 |
| PSBCH | 0, 5, 6, . . . , $N_{symb}^{S\text{-}SSB} - 1$ | 0, 1, . . . , 131 |
| DM-RS for PSBCH | 0, 5, 6, . . . , $N_{symb}^{S\text{-}SSB} - 1$ | 0, 4, 8, . . . , 128 |

Synchroniztion Acquisition of SL Terminal

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 8:
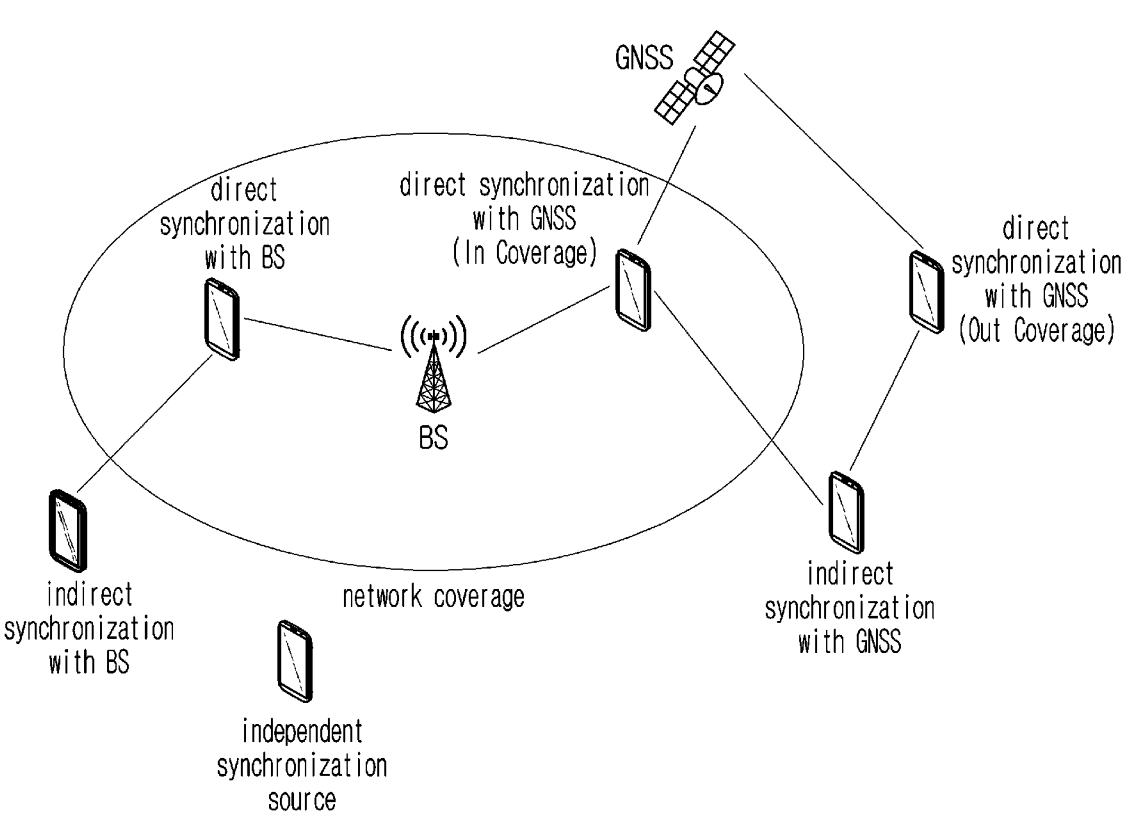
FIG. 8 illustrates a synchronization source or synchronization reference of V2X applicable to the present disclosure.

FIG. 8 illustrates a synchronization source or synchronization reference of V2X applicable to the present disclosure. The embodiment of FIG. 8 may be combined with various embodiments of the present disclosure.

Referring to FIG. 8, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communication. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 2] or [Table 3]. [Table 2] or [Table 3] is merely an example, and the relationship between synchronization sources and synchronization priorities may be defined in various manners.

TABLE 2

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with NB/gNB |
| P2 | All UEs synchronized indirectly with GNSS | All UEs synchronized indirectly with eNB/gNB |
| P3 | All other UEs | GNSS |
| P4 | N/A | All UEs synchronized directly with GNSS |
| P5 | N/A | All UEs synchronized indirectly with GNSS |
| P6 | N/A | All other UEs |

TABLE 3

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 2] or [Table 3], P0 may represent a highest priority, and P6 may represent a lowest priority. In [Table 2] or [Table 3], the BS may include at least one of a gNB or an eNB.

Whether to use GNSS-based synchronization or eNB/gNB-based synchronization may be (pre)determined. In a single-carrier operation, the UE may derive its transmission timing from an available synchronization reference with the highest priority.

For example, the UE may (re)select a synchronization reference, and the UE may obtain synchronization from the synchronization reference. In addition, the UE may perform SL communication (e.g., PSCCH/PSSCH transmission/reception, physical sidelink feedback channel (PSFCH) transmission/reception, S-SSB transmission/reception, reference signal transmission/reception, etc.) based on the obtained synchronization.

Figure 9A:
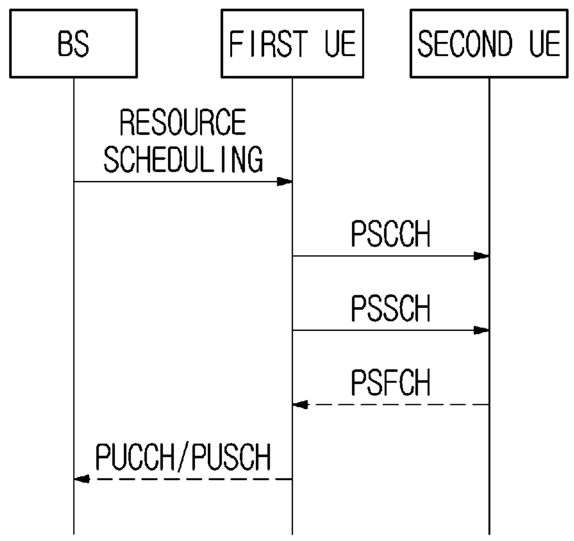
FIGS. 9A and 9B illustrate a procedure of performing V2X or SL communication by a terminal based on a transmission mode applicable to the present disclosure.
Figure 9B:
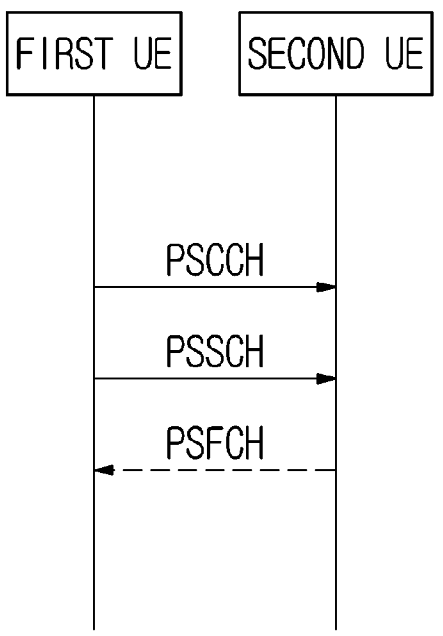

FIGS. 9A and 9B illustrate a procedure of performing V2X or SL communication by a terminal based on a transmission mode applicable to the present disclosure. The embodiment of FIGS. 9A and 9B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 9A exemplifies a UE operation related to an LTE transmission mode 1 or an LTE transmission mode 3. Alternatively, for example, FIG. 9B exemplifies a UE operation related to an NR resource allocation mode 1. For example, the LTE transmission mode 1 may be applied to general SL communication, and the LTE transmission mode 3 may be applied to V2X communication.

For example, FIG. 9B exemplifies a UE operation related to an LTE transmission mode 2 or an LTE transmission mode 4. Alternatively, for example, FIG. 9A exemplifies a UE operation related to an NR resource allocation mode 2.

Referring to FIG. 9A, in the LTE transmission mode 1, the LTE transmission mode 3, or the NR resource allocation mode 1, a BS may schedule an SL resource to be used by the UE for SL transmission. For example, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

Subsequently, the first UE may transmit a PSCCH (e.g., sidelink control information (SCI) or 1st-stage SCI) to a second UE based on the resource scheduling. After then, the first UE may transmit a PSSCH (e.g., 2nd-stage SCI, MAC PDU, data, etc.) related to the PSCCH to the second UE. After then, the first UE may receive a PSFCH related to the PSCCH/PSSCH from the second UE. For example, HARQ feedback information (e.g., NACK information or ACK information) may be received from the second UE through the PSFCH. After then, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1. Table 4 shows an example of a DCI for SL scheduling.

TABLE 4

| 3GPP TS 38.212 |
|---|
| Format 3_0 |
| DCI format 3_0 is used for scheduling of NR PSCCH and NR PSSCH in one cell.<br>The following information is transmitted by means of the DCI format 3_0 with CRC scrambled by SL-RNTI or SL-CS-RNTI:<br>Resource pool index - $\lceil \log_2 I \rceil$ bits, where I is the number of resource pools for transmission configured by the higher layer parameter sl-TxPoolScheduling.<br>Time gap - 3 bits determined by higher layer parameter sl-DCI-ToSL-Trans, as defined in clause 8.1.2.1 of [6, TS 38.214]<br>HARQ process number - 4 bits as defined in clause 16.4 of [5, TS 38.213]<br>New data indicator - 1 bit as defined in clause 16.4 of [5, TS 38.213]<br>Lowest index of the subchannel allocation to the initial transmission -<br>$\lceil \log_2(N^{SL}_{subChannel}) \rceil$ bits as defined in clause 8.1.2.2 of [6, TS 38.214]<br>SCI format 1-A fields according to clause 8.3.1.1:<br>Frequency resource assignment.<br>Time resource assignment.<br>PSFCHI-to-HARQ feedback timing indicator - $\lceil \log_s N_{fb\_timing} \rceil$ bits, where $N_{fb\_timing}$ is the number of entries in the higher layer parameter sl-PSFCII-ToPUCCII, as defined in clause 16.5 of [5, TS 38.213]<br>PUCCH resource indicator - 3 bits as defined in clause 16.5 of [5, TS 38.213].<br>Configuration index - 0 bit if the UE is not configured to monitor DCI format 3_0 with CRC scrambled by SL-CS-RNTI; otherwise 3 bits as defined in clause 8.1.2 of [6, TS 38.214]l. If the UE is configured to monitor DCI format 3_0 with CRC scrambled by SL-CS-RNTI, this field is reserved for DCI format 3_0 with CRC scrambled by SL-RNTI.<br>Counter sidelink assignment index - 2 bits<br>2 bits as defined in clause 16.5.2 of 15, TS 38.213] if the UE is configured with pdsch-HARQ-ACK-Codebook = dynamic<br>2 bits as defined in clause 16.5.1 of [5. TS 38.213] if the UE is configured with pdsch-HARQ-ACK-Codebook = semi-static<br>Padding bits, if required |
| Format 3_1 |
| DCI format 3_1 is used for scheduling of LTE PSCCH and LTE PSSCH in one cell.<br>The following information is transmitted by means of the DCI format 3_1 with CRC scrambled by SL-L-CS-RNTI:<br>Timing offset - 3 bits determined by higher layer parameter sl-TimeOffsetEUTRA, as defined in clause 16.6 of 15, TS 38.213l<br>Carrier indicator -3 bits as defined in 5.3.3.1.9A of [11, TS 36.212].<br>Lowest index of the subchannel allocation to the initial transmission -<br>$\lceil \log_2(N^{SL}_{subchannel}) \rceil$ bits as defined in 5.3.3.1.9A of [11, TS 36.212].<br>Frequency resource location of initial transmission and retransmission, as defined in 5.3.3.1.9A of [11. TS 36.212]<br>Time gap between initial transmission and retransmission, as defined in 5.3.3.1.9A of [11, TS 36.212]<br>SL index - 2 bits as defined in 5.3.3.1.9A of [11, TS 36.212]<br>SL SPS configuration index - 3 bits as defined in clause 5.3.3.1.9A of [11, TS 36.212].<br>Activation/release indication - 1 bit as defined in clause 5.3.3.1.9A of [11, TS 36.212]. |

Referring to FIG. 9B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannel(s). For example, subsequently, a first UE which has selected resource(s) from a resource pool by itself may transmit a PSCCH (e.g., sidelink control information (SCI) or 1st-stage SCI) to a second UE by using the resource(s). After then, the first UE may transmit a PSSCH (e.g., $2^{nd}$-stage SCI, MAC PDU, data, etc.) related to the PSCCH to the second UE. In step S8030, the first UE may receive a PSFCH related to the PSCCH/PSSCH from the second UE.

Referring to FIGS. 9A and 9B, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B. Table 5 shows an example of a $1^{st}$-stage SCI format.

TABLE 5

| 3GPP TS 38.212 |
|---|
| SCI format 1-A |

SCI format 1-A is used for the scheduling of PSSCH and $2^{nd}$-stage-SCI on PSSCH
The following information is transmitted by means of the SCI format 1-A:

Priority—3 bits as specified in clause 5.4.3.3 of [12, TS 23.287] and clause 5.22.1.3.1 of [8, TS 38.321].

Frequency resource assignment—$\left\lceil \log_2\left(\frac{N^{SL}_{subChannel}(N^{SL}_{subChannel}+1)}{2}\right)\right\rceil$ bits when the value of the higher layer parameter sl-MaxNumPerReserve is configured to 2: otherwise $\left\lceil \log_2\left(\frac{N^{SL}_{subChannel}(N^{SL}_{subChannel}+1)(2N^{SL}_{subChannel}+1)}{6}\right)\right\rceil$ bits when the value of the higher layer parameter sl-MaxNumPerReserve is configured to 3, as defined in clause 8.1.2.2 of [6, TS 38.214].

Time resource assignment—5 bits when the value of the higher layer parameter sl-MaxNumPerReserve is configured to 2: otherwise 9 bits when the value of the higher layer parameter sl-MaxNumPerReserve is configured to 3, as defined in clause 8.1.2.1 of [6, TS 38.214].

Resource reservation period—$\lceil \log_2 N_{rsv\_period} \rceil$ bits as defined in clause 8.1.4 of [6, TS 38.214], where $N_{rsv\_period}$ is the number of entries in the higher layer parameter sl-ResourceReservePeriodList, if higher layer parameter sl-MultiReserveResource is configured: 0 bit otherwise.

DMRS pattern—$\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.
$2^{nd}$-stage SCI format—2 bits as defined in Table 8.3.1.1-1.
Beta_Offset indicator—2 bits as provided by higher layer parameter sl-BetaOffsets2ndSCI and Table 8.3.1.1-2.
Number of DMRS port—1 bit as defined in Table 8.3.1.1-3.
Modulation and coding scheme—5 bits as defined in clause 8.1.3 of [6, TS 38.214].
Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.
PSFCH overhead indication—1 bit as defined clause 8.1.3.2 of 16, TS 38.214] if higher layer parameter sl-PSFCH-Period = 2 or 4; 0 bit otherwise.
Reserved—a number of bits as determined by higher layer parameter sl-NumReservedBits, with value set to zero.

Table 8.3.1.1-1: $2^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 8.3.1.1-2

| Mapping of Beta_offset indicator values to indexes in Table 9.3-2 of [5, TS38.213] | |
|---|---|
| Value of Beta_offset indicator | Beta_offset index in Table 9.3-2 of [5, TS38.213] |
| 00 | 1 st index provided by higher layer parameter sl-BetaOffsets2ndSCI |
| 01 | 2nd index provided by higher layer parameter sl-BetaOffsets2ndSCI |
| 10 | 3rd index provided by higher layer parameter st-BetaOffsets2ndSCI |

TABLE 8.3.1.1-2-continued

| Mapping of Beta_offset indicator values to indexes in Table 9.3-2 of [5, TS38.213] | |
|---|---|
| Value of Beta_offset indicator | Beta_offset index in Table 9.3-2 of [5, TS38.213] |
| 11 | 4th index provided by higher layer parameter sl-BetaOffsets2ndSCI |

TABLE 8.3.1.1-3

| Number of DMRS port(s) | |
|---|---|
| Value of the Number of DMRS port field | Antenna ports |
| 0 | 1000 |
| 1 | 1000 and 1001 |

TABLE 6

3GPP TS 38.212

8.4.1.1 SCI format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

- HARQ process number - 4 bits as defined in clause 16.4 of [5, TS 38.213].
- New data indicator - 1 bit as defined in clause 16.4 of [5, TS 38.213].
- Redundancy version - 2 bits as defined in clause 16.4 of [6, TS 38.214].
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Cast type indicator - 2 bits as defined in Table 8.4.1.1-1.
- CSI request - 1 bit as defined in clause 8.2.1 of [6, TS 38.214].

Table 8.4.1.1-1: Cast type indicator

| Value of Cast type indicator | Cast Type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

8.4.1.2 SCI format 2-B

SCI format 2-B is used for the decoding of PSSCH, with HARQ operation, when HARQ-ACK information includes only NACK, or when there is no feedback of HARQ-ACK information.

The following information is transmitted by means of the SCI format 2-B:

- HARQ process number - 4 bits as defined in clause 16.4 of [5, TS 38.213].
- New data indicator - 1 bit as defined in clause 16.4 of [5, TS 38.213].
- Redundancy version - 2 bits as defined in clause 16.4 of [6, TS 38.214].
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Zone ID - 12 bits as defined in clause 5.8.11 of [9, TS 38.331].

- Communication range requirement - 4 bits determined by higher layer parameter sl-ZoneConfigMCR-Index.

Referring to FIGS. 9A and 9B, the first UE may receive the PSFCH based on Table 7. For example, the first UE and the second UE may determine a PSFCH resource based on Table 7, and the second UE may transmit HARQ feedback to the first UE using the PSFCH resource.

TABLE 7

| 3GPP TS 38.213 |
|---|
| 16.3 UE procedure for reporting HARQ-ACK on sidelink<br>A UE can be indicated by an SCI format scheduling a PSSCH reception, in one or more sub-channels from a number of $N_{subch}^{PSSch}$ sub-channels, to transmit a PSFCH with HARD-QACK information in response to the PSSCH reception. The UE provides HARQ-ACK information that includes ACK or NACK, or only NACK.<br>A UE can be provided, by sl-PSFCH-Period-r16, a number of slots in a resource pool for a period of PSFCH transmission occasion resources. If the number is zero, PSFCH transmissions from the UE in the resource pool are disabled.<br>A UE expects that a slot $t'^{SL}_k (0 \le k < T'_{max})$ has a PSFCH transmission occasion resource if k mod $N_{PSSCH}^{PSFCH} = 0$, where $t'^{SL}_k$ is defined in [6, *TS* 38.214], and $T'_{max}$ is a number of slots that belong to the resource pool within 10240 msec according to [6, TS 38.214], and $N_{PSSCH}^{PSFCH}$ is provided by sl-PSFCH-Period-r16.<br>A UE may be indicated by higher layers to not transmit a PSFCH in response to a PSSCH reception [11, TS 38.321].<br>If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.<br>A UE is provided by sl-PSFCH-RB-Set-r16 a set of $M_{PRB,set}^{PSFCH}$, set PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the $\left[\left(i + j \cdot N_{PSCCH}^{PSFCH}\right) \cdot M_{subch.slot}^{PSFCH}, \left(i + 1 + j \cdot N_{PSSCH}^{PSFCH}\right) \cdot M_{subch,slot}^{PSFCH} - 1\right]$ PBs from the $M_{PRB,set}^{PSFCH}$ PRBs to slot i among the PSSCH slots associated with the PSFCH slot and sub-channel j, where $M_{subch,slot}^{PSFCH} = M_{PRB,set}^{PSFCH} / \left(N_{subch} \cdot N_{P33CH}^{PSFCH}\right)$, $0 \le i < N_{PSSCH}^{PSFCH}$, $0 \le j < N_{subch}$, and the allocation starts in an ascending order of i and continues in an ascending order of j. The UE expects that $M_{PRB,set}^{PSFCH}$ is a multiple of $N_{subch} \cdot N_{PSSCH}^{PSFCH}$.<br>A UE determines a number of PSFCH resources available for multiplexing HARQ-ACK information in a PSFCH transmission as $R_{PRB,CS}^{PSFCH} = N_{type}^{PSFCH} \cdot M_{subch,slot}^{PSFCH} \cdot N_{CS}^{PSFCH} \cdot N_{CS}^{PSFCH}$ where $N_{CS}^{PSFCH}$ is a number of cyclic shift pairs for the resource pool and, based on an indication by higher layers,<br>$N_{type}^{PSFCH} = 1$ and the $M_{subch,slot}^{PSFCH}$ PRBs are associated with the starting sub-channel of the corresponding PSSCH<br>$N_{type}^{PSFCH} = N_{subch}^{PSSCH}$ and the $N_{subch}^{PSSCH} \cdot M_{subch,slot}^{PSFCH}$ PRBs are associated with one or more sub-channels from the $N_{subch}^{PSSCH}$ sub-channels of the corresponding PSSCH |

TABLE 7-continued

3GPP TS 38.213

The PSFCH resources are first indexed according to an ascending order of the PRB index, from the $N_{type}^{PSFCH} \cdot M_{subch,slot}^{PSFCH}$ PRBs, and then according to an ascending order of the cyclic shift pair index from the $N_{CS}^{PSFCH}$ cyclic shift pairs.

A UE determines an index of a PSFCH resource for a PSFCH transmission in response to a PSSCH reception as $(P_{ID} + M_{ID}) \bmod R_{PRB,CS}^{PSFCH}$ where $P_{ID}$ is a physical layer source ID provided by SCI format 2-A or 2-B [5, TS 38.212] scheduling the PSSCH reception, and Mmp is the identity of the UE receiving the PSSCH as indicated by higher layers if the UE detects a SCI format 2-A with Cast type indicator field value of "01"; otherwise, MID is zero.

A UE determines a mo value, for computing a value of cyclic shift a [4, TS 38.211], from a cyclic shift pair index corresponding to a PSFCH resource index and from $N_{CS}^{PSFCH}$ using Table 16.3-1.

Table 16.3-1: Set of cyclic shift pairs

| | $m_0$ | | | | | |
|---|---|---|---|---|---|---|
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | 1 | — | — |
| 3 | 0 | 2 | 4 | — | — | — |
| 6 | 0 | 1 | 2 | 3 | 4 | 5 |

A UE determines a $m_{CS}$ value, for computing a value of cyclic shift α [4, TS 38.211], as in Table 16.3-2 if the UE detects a SCI format 2-A with Cast type indicator field value of "01" or "10", or as in Table 16.3-3 if the UE detects a SCI format 2-B or a SCI format 2-A with Cast type indicator field value of "11". The UE applies one cyclic shift from a cyclic shift pair to a sequence used for the PSFCH transmission [4, TS 38.211].

Table 16.3-2: Mapping of HARQ-ACK information bit values to a cyclic shift, from a cyclic shift pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | 6 |

Table 16.3-3: Mapping of HARQ-ACK information bit values to a cyclic shift, from a cyclic shift pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | N/A |

Referring to FIG. 9A, the first UE may transmit SL HARQ feedback to the base station through the PUCCH and/or the PUSCH based on Table 8.

TABLE 8

3GPP TS 38.213

16.5 UE procedure for reporting HARQ-ACK on uplink

A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK information on the primary cell of the PUCCH group, as described in Clause 9, of the cell where the UE monitors PDCCH for detection of DCI format 3_0.

TABLE 8-continued

| 3GPP TS 38.213 |
|---|
| For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources.<br>For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0.<br>For each PSFCH reception occasion, from a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information, when applicable<br>if the UE receives a PSFCH associated with a SCI format 2-A with Cast type indicator field value of "10"<br>generate HARQ-ACK information with same value as a value of HARQ-ACK information the UE determines from a PSFCH reception in the PSFCH reception occasion and, if the UE determines that a PSFCH is not received at the PSFCH reception occasion, generate NACK<br>if the UE receives a PSFCH associated with a SCI format 2-A with Cast type indicator field value of "01"<br>generate ACK if the UE determines ACK from at least one PSFCH reception occasion, from the number of PSFCH reception occasions, in PSFCH resources corresponding to every identity $M_{ID}$ of the UEs that the UE expects to receive the PSSCH, as described in Clause 16.3; otherwise, generate NACK<br>if the UE receives a PSFCH associated with a SCI format 2-B or a SCI format 2-A with Cast type indicator field value of "11"<br>generate ACK when the UE determines absence of PSFCH reception for each PSFCH reception occasion from the number of PSFCH reception occasions; otherwise, generate NACK<br>After a UE transmits PSSCHs and receives PSFCHs in corresponding PSFCH resource occasions, the priority value of HARQ-ACK information is same as the priority value of the PSSCH transmissions that is associated with the PSFCH reception occasions providing the HARQ-ACK information.<br>The UE generates a NACK when, due to prioritization, as described in Clause 16.2.4, the UE does not receive PSFCH in any PSFCH reception occasion associated with a PSSCH transmission in a resource provided by a DCI format 3_0 with CRC scrambled by a SL-RNTI or, for a configured grant, in a resource provided in a single period and for which the UE is provided a PUCCH resource to report HARQ-ACK information. The priority value of the NACK is same as the priority value of the PSSCH transmission.<br>The UE generates a NACK when, due to prioritization as described in Clause 16.2.4, the UE does not transmit a PSSCH in any of the resources provided by a DCI format 3_0 with CRC scrambled by SL-RNTI or, for a configured grant, in any of the resources provided in a single period and for which the UE is provided a PUCCH resource to report HARQ-ACK information. The priority value of the NACK is same as the priority value of the PSSCH that was not transmitted due to prioritization.<br>The UE generates an ACK if the UE does not transmit a PSCCH with a SCI format 1-A scheduling a PSSCH in any of the resources provided by a configured grant in a single period and for which the UE is provided a PUCCH resource to report HARQ-ACK information. The priority value of the ACK is same as the largest priority value among the possible priority values for the configured grant.<br>A UE does not expect to be provided PUCCH resources or PUSCH resources to report HARQ-ACK information that start earlier than $(N + 1) \cdot (2048 + 144) \cdot \kappa \cdot 2^{\mu} \cdot T_c$ after the end of a last symbol of a last PSFCH reception occasion, from a number of PSFCH reception occasions that the UE generates HARQ-ACK information to report in a PUCCH or PUSCH transmission, where<br>$\kappa$ and $T_c$ are defined in [4, TS 38.211]<br>$\mu = \min(\mu_{SL}, \mu_{UL})$, where $\mu_{SL}$ is the SCS configuration of the SL BWP and $\mu_{UL}$ is the SCS configuration of the active UL BWP on the primary cell<br>N is determined from $\mu$ according to Table 16.5-1 |

Table 16.5-1: Values of N

| μ | N |
|---|---|
| 0 | 14 |
| 1 | 18 |
| 2 | 28 |
| 3 | 32 |

With reference to slots for PUCCH transmissions and for a number of PSFCH reception occasions ending in slot n, the UE provides the generated HARQ-ACK information in a PUCCH transmission within slot n + k, subject to the overlapping conditions in Clause 9.2.5, where k is a number of slots indicated by a PSFCH-to-HARQ_feedback timing indicator field, if present, in a DCI format indicating a slot for PUCCH transmission to report the HARQ-ACK information, or k is provided by sl-PSFCH-ToPUCCH-CG-Type1-r16. k = 0 corresponds to a last slot for a PUCCH transmission that would overlap with the last PSFCH reception occasion assuming that the start of the sidelink frame is same as the start of the downlink frame [4, TS 38.211].
For a PSSCH transmission by a UE that is scheduled by a DCI format, or for a SL configured grant Type 2 PSSCH transmission activated by a DCI format, the DCI format indicates to the UE that a PUCCH resource is not provided when a value of the PUCCH resource indicator field is zero and a TABLE 8-continued

| 3GPP TS 38.213 |
| --- |
| value of PSFCH-to-HARQ feedback timing indicator field, if present, is zero. For a SL configured grant Type 1 PSSCH transmission, a PUCCH resource can be provided by sl-NIPUCCH-AN-r16 and sl-PSFCH-ToPUCCH-CG-Typel-r16. If a PUCCH resource is not provided, the UE does not transmit a PUCCH with generated HARQ-ACK information from PSFCH reception occasions. |
| For a PUCCH transmission with HARQ-ACK information, a UE determines a PUCCH resource after determining a set of PUCCH resources for $O_{UCI}$ HARQ-ACK information bits, as described in Clause 9.2.1. The PUCCH resource determination is based on a PUCCH resource indicator field [5, TS 38.212] in a last DCI format 3_0, among the DCI formats 3_0 that have a value of a PSFCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are indexed in an ascending order across PDCCH monitoring occasion indexes. |
| A UE does not expect to multiplex HARQ-ACK information for more than one SL configured grants in a same PUCCH. |
| A priority value of a PUCCH transmission with one or more sidelink HARQ-ACK information bits is the smallest priority value for the one or more HARQ-ACK information bits. |
| In the following, the CRC for DCI format 3_0 is scrambled with a SL-RNTI or a SL-CS-RNTI. |

Figure 10A:
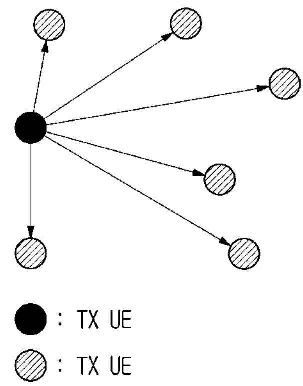
FIGS. 10A to 10C illustrate three cast types applicable to the present disclosure.
Figure 10B:
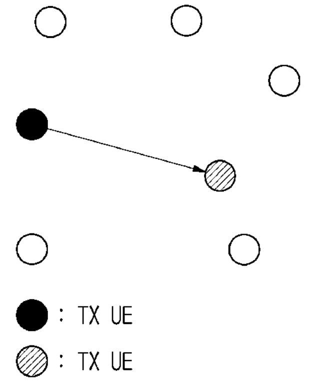
Figure 10C:
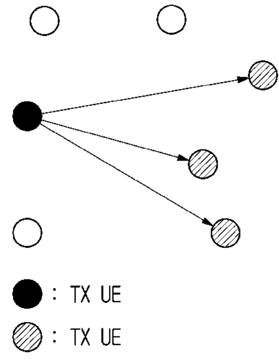

FIGS. 10A to 10C illustrate three cast types applicable to the present disclosure. The embodiment of FIGS. 10A to 10C may be combined with various embodiments of the present disclosure.

Specifically, FIG. 10A exemplifies broadcast-type SL communication, FIG. 10B exemplifies unicast type-SL communication, and FIG. 10C exemplifies groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hybrid Automatic Request (HARQ) Procedure

SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

In the present disclosure, HARQ-ACK may be referred to as ACK, ACK information, or positive-ACK information, and HARQ-NACK may be referred to as NACK, NACK information, or negative-ACK information.

SL Measurement and Reporting

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

Sidelink Congestion Control

For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Figure 11:
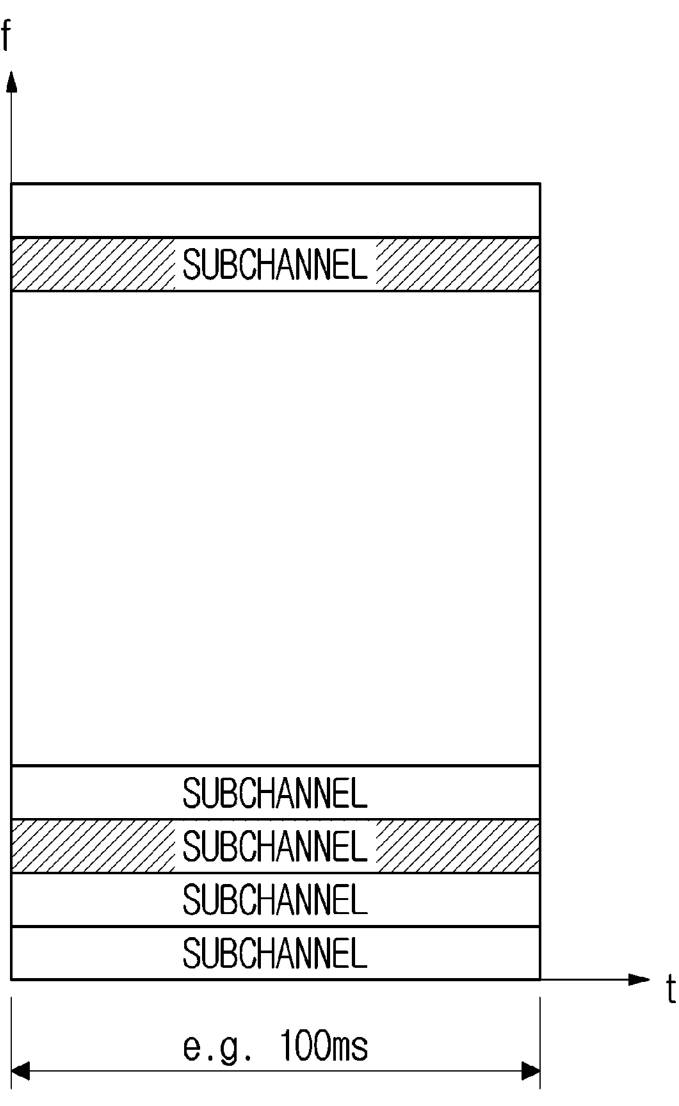
FIG. 11 illustrates a resource unit for channel busy ratio (CBR) measurement, applicable to the present disclosure.

FIG. 11 illustrates resource units for CBR measurement applicable to the present disclosure. The embodiment of FIG. 11 may be combined with various embodiments of the present disclosure.

Referring to FIG. 11, a CBR may refer to the number of subchannels of which the RS SI measurements are equal to or larger than a predetermined threshold as a result of measuring an RSSI in each subchannel during a specific period (e.g., 100 ms) by a UE. Alternatively, a CBR may refer to a ratio of subchannels having values equal to or greater than a predetermined threshold among subchannels during a specific period. For example, in the embodiment of FIG. 11, on the assumption that the hatched subchannels have values greater than or equal to a predetermined threshold, the CBR may refer to a ratio of hatched subchannels for a time period of 100 ms. In addition, the UE may report the CBR to the BS.

For example, when a PSCCH and a PSSCH are multiplexed in a frequency domain, the UE may perform one CBR measurement in one resource pool. When PSFCH resources are configured or preconfigured, the PSFCH resources may be excluded from the CBR measurement.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

An example of SL CBR and SL RSSI is as follows. In the description below, the slot index may be based on a physical slot index.

A SL CBR measured in slot n is defined as the portion of sub-channels in the resource pool whose SL RSSI measured by the UE exceed a (pre-)configured threshold sensed over a CBR measurement window [n−a, n−1]. Herein, a is equal to 100 or $100 \cdot 2^{\mu}$ slots, according to higher layer parameter sl-TimeWindowSizeCBR. The SL CBR is applicable for RRC_IDLE intra-frequency, RRC_IDLE inter-frequency, RRC_CONNECTED intra-frequency, or RRC_CONNECTED inter-frequency.

A SL RSSI is defined as the linear average of the total received power (in [W]) observed in the configured sub-channel in OFDM symbols of a slot configured for PSCCH and PSSCH, starting from the $2^{nd}$ OFDM symbol. For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. The SL RSSI is applicable for RRC_IDLE intra-frequency, RRC_IDLE inter-frequency, RRC_CONNECTED intra-frequency or RRC_CONNECTED inter-frequency.

An example of an SL (Channel occupancy Ratio) is as follows. The SL CR evaluated at slot n is defined as the total number of sub-channels used for its transmissions in slots [n−a, n−1] and granted in slots [n, n+b] divided by the total number of configured sub-channels in the transmission pool over [n−a, n+b]. The SL CR is applicable for RRC_IDLE intra-frequency, RRC_IDLE inter-frequency, RRC_CONNECTED intra-frequency or RRC_CONNECTED inter-frequency. Herein, a may be a positive integer and b may be 0 or a positive integer. a and b may be determined by UE implementation with a+b+1=1000 or $1000 \cdot 2^{\mu}$ slots, according to higher layer parameter sl-TimeWindowSizeCR, b<(a+b+1)/2, and n+b shall not exceed the last transmission opportunity of the grant for the current transmission. The SL CR is evaluated for each (re)transmission. In evaluating SL CR, the UE shall assume the transmission parameter used at slot n is reused according to the existing grant(s) in slot [n+1, n+b] without packet dropping. The slot index is based on physical slot index. The SL CR can be computed per priority level. A resource is considered granted if it is a member of a selected sidelink grant as defined in TS 38.321.

Positioning

Figure 12:
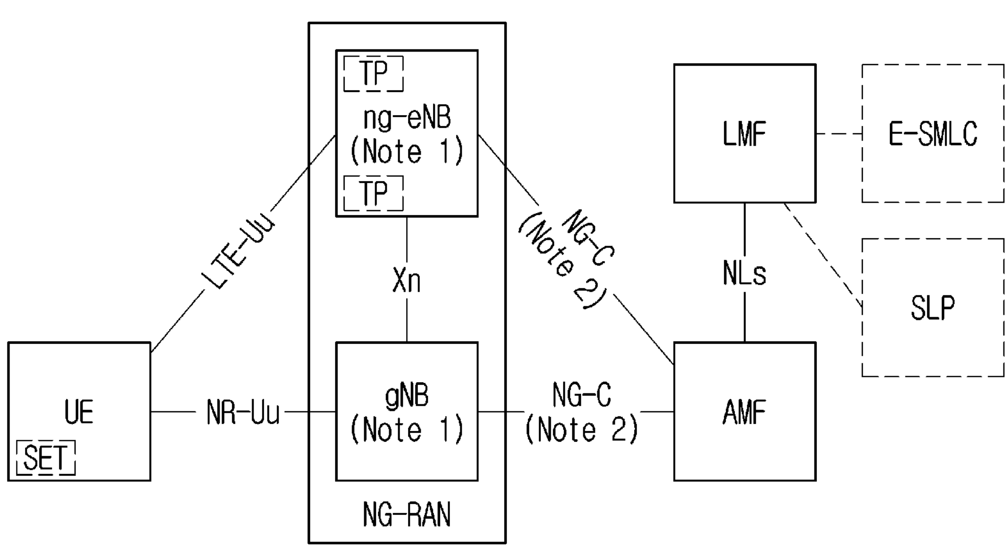
FIG. 12 illustrates an example of an architecture in a 5G system, for positioning a UE which has accessed an NG-RAN or an evolved UMTS terrestrial radio access network (E-UTRAN) applicable to the present disclosure.

FIG. 12 illustrates an example of an architecture of a 5G system capable of positioning a UE connected to an NG-RAN or an E-UTRAN applicable to the present disclosure.

Referring to FIG. 12, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for an E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDOA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Figure 13:
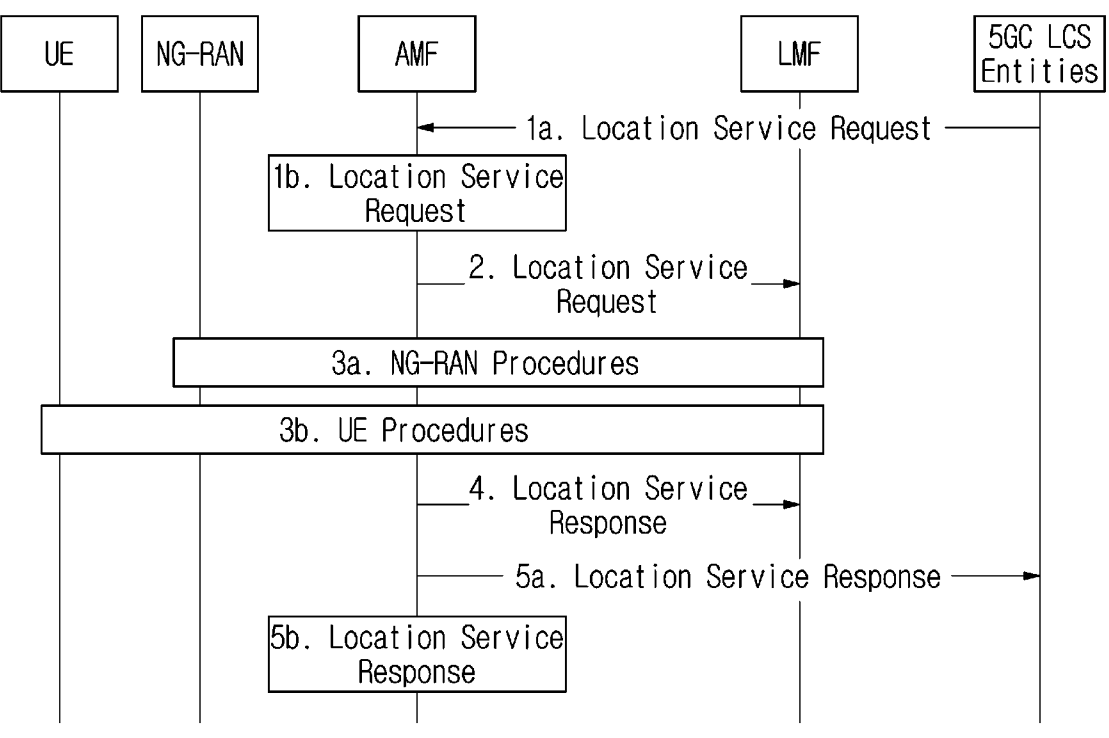
FIG. 13 illustrates an implementation example of a network for positioning a UE applicable to the present disclosure.

FIG. 13 illustrates exemplary implementation of a network for positioning a UE applicable to the present disclosure.

Upon receipt of a location service request when the UE is in a connection management—IDLE (CM-IDLE) state, the AMF may establish a signaling connection with the UE and request a network trigger service to assign a specific serving gNB or ng-eNB. This operation is not shown in FIG. 13. That is, FIG. 13 may be based on the assumption that the UE is in connected mode. However, the signaling connection may be released by the NG-RAN due to signaling and data deactivation during positioning.

Referring to FIG. 13, a network operation for positioning a UE will be described in detail. In step 1*a*, a 5GC entity such as a GMLC may request a location service for positioning a target UE to a serving AMF. However, even though the GMLC does not request the location service, the serving AMF may determine that the location service for positioning the target UE is required in step 1*b*. For example, for positioning the UE for an emergency call, the serving AMF may determine to perform the location service directly.

The AMF may then transmit a location service request to an LMF in step 2, and the LMF may start location procedures with the serving-eNB and the serving gNB to obtain positioning data or positioning assistance data in step 3*a*. Additionally, the LMF may initiate a location procedure for DL positioning with the UE in step 3*b*. For example, the LMF may transmit positioning assistance data (assistance data defined in 3GPP TS 36.355) to the UE, or obtain a location estimate or location measurement. Although step 3*b* may be additionally performed after step 3*a*, step 3*b* may be performed instead of step 3*a*.

In step 4, the LMF may provide a location service response to the AMF. The location service response may include information indicating whether location estimation of the UE was successful and the location estimate of the UE. Then, when the procedure of FIG. 13 is initiated in step 1*a*, the AMF may deliver the location service response to the 5GC entity such as the GMLC. When the procedure of FIG. 13 is initiated in step 1*b*, the AMF may use the location service response to provide the location service related to an emergency call or the like.

Figure 14:
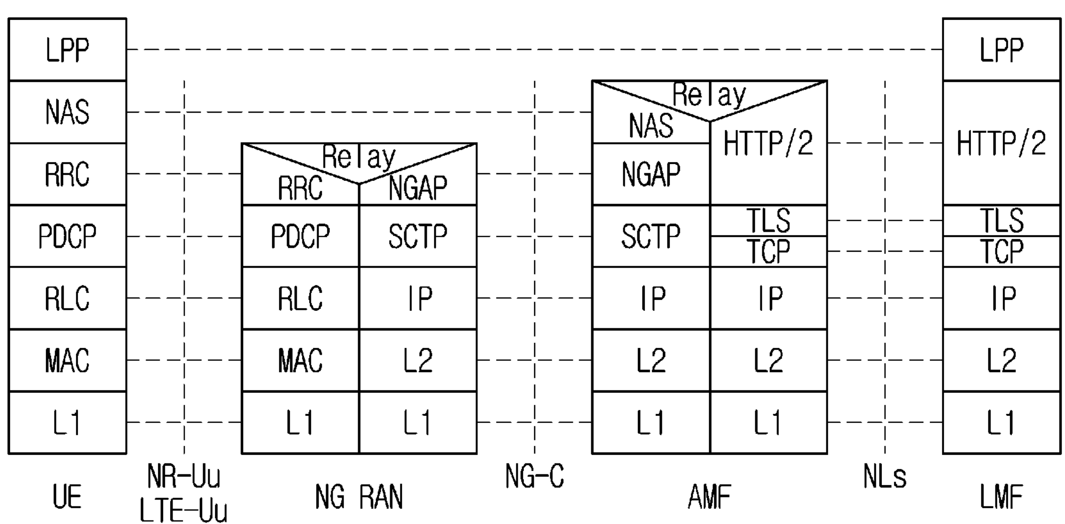
FIG. 14 illustrates exemplary protocol layers used to support LTE positioning protocol (LPP) message transmission between a location management function (LMF) and a UE applicable to the present disclosure.

FIG. 14 illustrates exemplary protocol layers used to support LTE positioning protocol (LPP) message transmission between an LMF and a UE applicable to the present disclosure.

An LPP PDU may be transmitted in a NAS PDU between the AMF and the UE. Referring to FIG. 14, the LPP may be terminated between a target device (e.g., a UE in the control plane or a SUPL enabled terminal (SET) in the user plane) and a location server (e.g., an LMF in the control plane or an SLP in the user plane). An LPP message may be transmitted in a transparent PDU over an intermediate network interface by using an appropriate protocol such as the NG application protocol (NGAP) via an NG-control plane (NG-C) interface or a NAS/RRC via LTE-Uu and NR-Uu interfaces. The LPP allows positioning for NR and LTE in various positioning methods.

For example, the target device and the location server may exchange capability information with each other, positioning assistance data and/or location information over the LPP. Further, error information may be exchanged and/or discontinuation of an LPP procedure may be indicated, by an LPP message.

Figure 15:
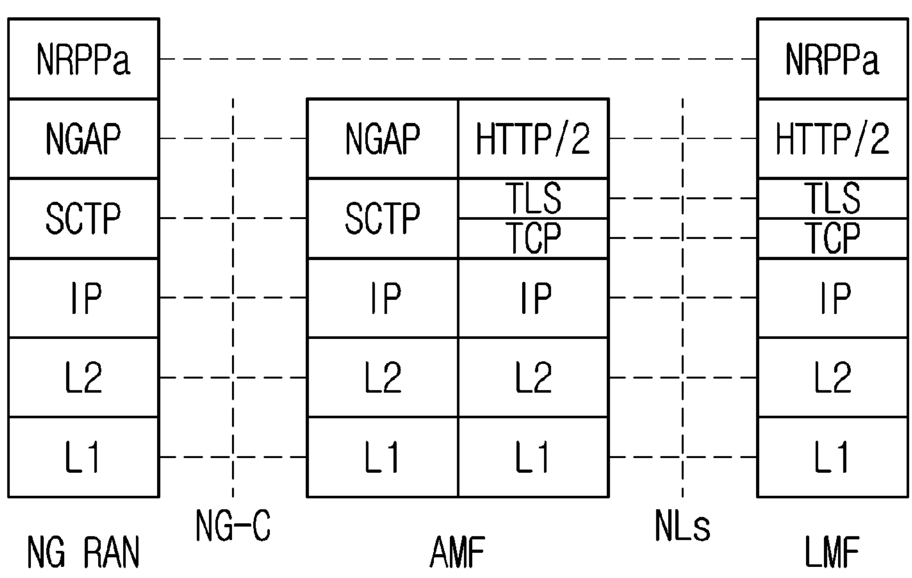
FIG. 15 illustrates exemplary protocol layers used to support NR positioning protocol A (NRPPa) protocol data unit (PDU) transmission between an LMF and an NG-RAN node applicable to the present disclosure.

FIG. 15 illustrates exemplary protocol layers used to support NR positioning protocol A (NRPPa) PDU transmission between an LMF and an NG-RAN node applicable to the present disclosure.

NRPPa may be used for information exchange between the NG-RAN node and the LMF. Specifically, NRPPa enables exchange of an enhanced-cell ID (E-CID) for a measurement transmitted from the ng-eNB to the LMF, data to support OTDOA positioning, and a Cell-ID and Cell location ID for NR Cell ID positioning. Even without information about a related NRPPa transaction, the AMF may route NRPPa PDUs based on the routing ID of the related LMF via an NG-C interface.

Procedures of the NRPPa protocol for positioning and data collection may be divided into two types. One of the two types is a UE-associated procedure for delivering information (e.g., positioning information) about a specific UE, and the other type is a non-UE-associated procedure for delivering information (e.g., gNB/ng-eNB/TP timing information) applicable to an NG-RAN node and related TPs. The two types of procedures may be supported independently or simultaneously.

Positioning methods supported by the NG-RAN include GNSS, OTDOA, E-CID, barometric pressure sensor positioning, WLAN positioning, Bluetooth positioning, terrestrial beacon system (TBS), and UL time difference of arrival (UTDOA). Although a UE may be positioned in any of the above positioning methods, two or more positioning methods may be used to position the UE.

(1) Observed Time Difference Of Arrival (OTDOA)

Figure 16:
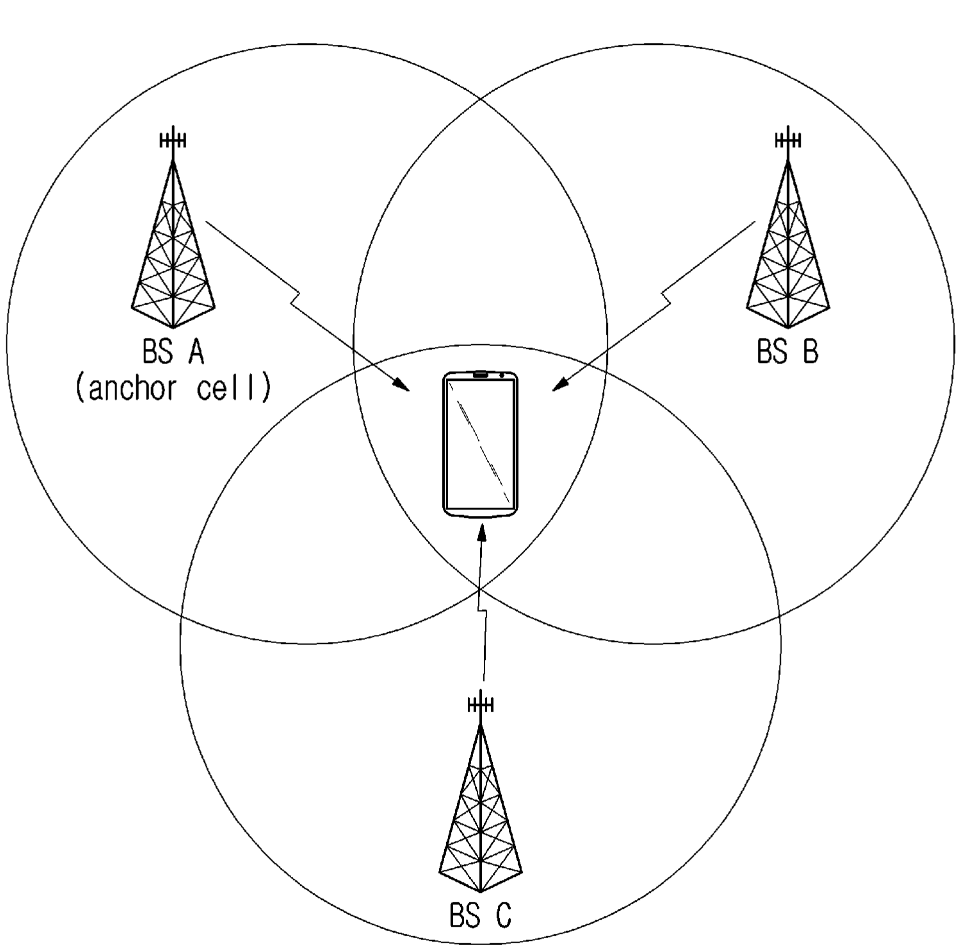
FIG. 16 illustrates an observed time difference of arrival (OTDOA) positioning method applicable to the present disclosure.

FIG. 16 is a diagram illustrating an OTDOA positioning method applicable to the present disclosure.

In the OTDOA positioning method, a UE utilizes measurement timings of DL signals received from multiple TPs including an eNB, ng-eNB, and a PRS-dedicated TP. The UE measures the timings of the received DL signals using positioning assistance data received from a location server.

The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

Herein, an RSTD may be defined based on a smallest relative time difference between the boundaries of two subframes received from a reference cell and a measurement cell. That is, the RSTD may be calculated as a relative timing difference for between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the time of arrivals (TOAs) of signals received from three or more geographically distributed TPs or BSs. For example, TOAs for TP 1, TP 2, and TP 3 may be measured, an RSTD for TP 1-TP 2, an RSTD for TP 2-TP 3, and an RSTD for TP 3-TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation 1.

$$RSTDi,1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{[Equation 1]}$$

where c is the speed of light, {xt, yt} is the (unknown) coordinates of the target UE, {xi, yi} is the coordinates of a (known) TP, and {x1, y1} is the coordinates of a reference TP (or another TP). (Ti-T1) is a transmission time offset between the two TPs, which may be referred to as "real time difference" (RTD), and ni and n1 may represent values related to UE TOA measurement errors.

(2) E-CID (Enhanced Cell ID)

In cell ID (CID) positioning, the location of a UE may be measured based on geographic information about the serving ng-eNB, serving gNB and/or serving cell of the UE. For example, the geographic information about the serving ng-eNB, the serving gNB, and/or the serving cell may be obtained by paging, registration, or the like.

For E-CID positioning, an additional UE measurement and/or NG-RAN radio resources may be used to improve a UE location estimate in addition to the CID positioning method. In the E-CID positioning method, although some of the same measurement methods as in the measurement control system of the RRC protocol may be used, an additional measurement is generally not performed only for positioning the UE. In other words, a separate measurement configuration or measurement control message may not be provided to position the UE, and the UE may also report a measured value obtained by generally available measurement methods, without expecting that an additional measurement operation only for positioning will be requested.

For example, the serving gNB may implement the E-CID positioning method using an E-UTRA measurement received from the UE.

Exemplary measurement elements that are available for E-CID positioning are given as follows.

UE measurements: E-UTRA RSRP, E-UTRA RSRQ, UE E-UTRA Rx-Tx time difference, GSM EDGE random access network (GERAN)/WLAN RSSI, UTRAN common pilot channel (CPICH) received signal code power (RSCP), and UTRAN CPICH EOM.

E-UTRAN measurements: ng-eNB Rx-Tx time difference, timing advance (TADV), and angle of arrival (AoA).

TADVs may be classified into Type 1 and Type 2 as follows.

TADV Type 1=(ng-eNB Rx-Tx time difference)+(UE E-UTRA Rx-Tx time difference)

TADV Type 2=ng-eNB Rx-Tx time difference

On the other hand, an AoA may be used to measure the direction of the UE. The AoA may be defined as an estimated angle of the UE with respect to the location of the UE counterclockwise from a BS/TP. A geographical reference direction may be North. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

(3) UTDOA (UL Time Difference of Arrival)

A UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

In addition, as an example, the description below is based on a terminal that performs sidelink communication based on a terminal scheduling mode (Mode 2). That is, a transmission terminal may determine a sidelink resource configured by a base station/network or a preconfigured sidelink resource on its own and transmit data to a reception terminal based on the sidelink resource. As an example, in a mode (Mode 1) where a base station schedules a resource, since the base station controls resource allocation, it may control resources so that transmission times do not collide in beam-based HARQ feedback transmission. On the other hand, in a terminal scheduling mode where a terminal determines a transmission resource on its own, since transmission times may collide in beam-based HARQ feedback transmission, a method for controlling this may be needed, which will be described below.

For convenience of explanation, the description below is based on a mode 2 terminal but is also applicable to an environment where mode 1 and mode 2 terminals exist together and to other situations and thus may not be limited to the mode 2 terminal.

Concrete Embodiment of the Present Disclosure

Hereinafter will be described a method for performing a V2X HARQ operation based on beam-based mmWave. As an example, in an existing communication system (e.g., LTE V2X), a signal may be omnidirectionally radiated. However, in a new communication system, communication may be performed based on a beam that is radiated in a specific direction based on mmWave. As an example, in the case of a connected car or an autonomous vehicle, a terminal may require transmission with high throughput and reliability being ensured. In addition, in view of the mobility of a terminal, a scheme for securing low-latency communication may be needed, and beam-based communication may be performed to this end.

Herein, in case terminal-to-terminal communication is performed based on a beam, the communication can have high throughput and reliability only when a beam direction of a transmission terminal and a beam direction of a reception terminal correspond to each other. That is, a transmission terminal and a reception terminal may transmit and receive a signal through a single beam with corresponding directions at a specific time by considering mmWave beam features.

In addition, as an example, an existing communication system (e.g., LTE V2X) may support only a broadcast service. On the other hand, in a new communication system, a PSFCH feedback operation may be performed by considering unicast and groupcast transmission to ensure reliable transmission in V2X. That is, after a reception terminal receives sideline (SL) data from a transmission terminal, the reception terminal may transmit feedback to the transmission terminal at a specific time through PSFCH. That is, a reception terminal may perform HARQ transmission by periodically performing a PSFCH feedback operation at a specific time. Herein, there may be a plurality of terminal-to-terminal communications based on terminal pairs, and one terminal may perform a V2X communication with each of a plurality of terminals.

Herein, in case a signal is omnidirectionally transmitted in an existing communication system, one terminal may multiplex and transmit feedback information for each of a plurality of terminals together. On the other hand, in case HARQ feedback is performed based on a beam, since a terminal can transmit feedback information to only one terminal based on a beam direction at a specific time, if feedback transmission times overlap, another terminal may be incapable of receiving feedback information.

Accordingly, in consideration of what is described above, when beam-based HARQ feedback is performed based on mmWave, if feedback transmissions collide at a specific time, a transmission method may need to be determined, which will be described below.

Figure 17:
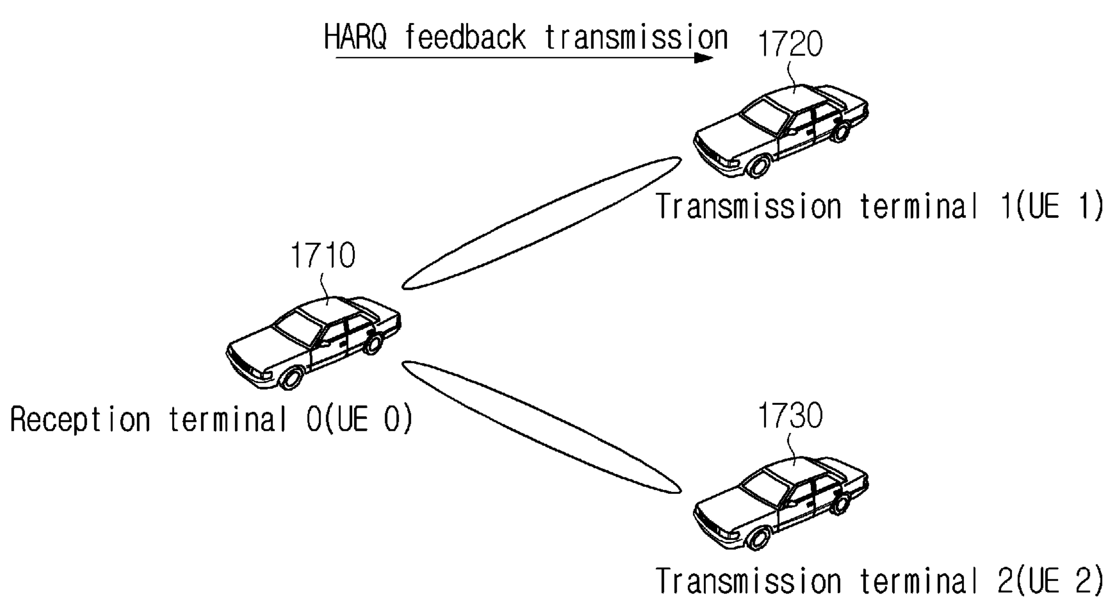
FIG. 17 is a view illustrating a case in which feedback transmission times overlap in a reception terminal according to an embodiment of the present disclosure.

FIG. 17 is a view illustrating a case in which feedback transmission times overlap in a reception terminal according to an embodiment of the present disclosure.

As an example, after a reception terminal receives data from a transmission terminal, the reception terminal may transmit ACK/NACK to the transmission terminal through a PSFCH channel That is, the reception terminal may indicate to the transmission terminal HARQ feedback information regarding whether or not the reception terminal has received sideline data rightly. Herein, the HARQ feedback information may be transmitted from the reception terminal to the transmission terminal through the PSFCH channel.

As an example, a PSFCH channel may be transmitted in a specific slot based on a specific period through a resource pool and PSFCH configuration of a RRC layer. That is, a transmission resource and a transmission period, in which HARQ feedback information is transmitted, may be determined based on resource pool and PSFCH configuration information.

Herein, as described above, in case beam-based feedback transmission is considered based on mmWave in V2X communication, a terminal may not be capable of simultaneously transmitting a signal at a specific time to terminals that are aligned in another beam.

As a concrete example, referring to FIG. 17, a terminal 0 (UE 0) 1710 may receive sidelink data from a terminal 1 (UE 1) 1720 and a terminal 2 (UE 2) 1730 respectively and, based on this, transmit HARQ feedback information to each of the terminals 1710 and 1720. That is, sideline communication between the terminal 0 1710 and the terminal 1 1720 and sidelink communication between the terminal 0 1710 and the terminal 2 1720 may be configured separately.

Herein, as an example, a resource pool used in relation to sideline communication of the terminal 0 (UE 0) 1710, the terminal 1 (UE 1) 1720 and the terminal 2 (UE 2) 1730 respectively may be identically configured. Herein, as another example, a resource pool used in relation to sideline communication of the terminal 0 (UE 0) 1710, the terminal 1 (UE 1) 1720 and the terminal 2 (UE 2) 1730 respectively may also be differently configured. In addition, in a resource pool used in relation to sideline communication of the terminal 0 (UE 0) 1710, the terminal 1 (UE 1) 1720 and the terminal 2 (UE 2) 1730 respectively, each expected HARQ timing may be identically configured. As another example, in a resource pool used in relation to sideline communication of the terminal 0 (UE 0) 1710, the terminal 1 (UE 1) 1720 and the terminal 2 (UE 2) 1730 respectively, each expected HARQ timing may be differently configured.

Herein, as an example, when the terminal 0 1710 receives data from each of the terminals 1720 and 1730 and then transmits HARQ feedback information to each of the terminals 1720 and 1730, an overlap of HARQ timing may be considered. More specifically, referring to FIG. 18, timing of HARQ feedback, which is expected to be transmitted from the terminal 0 1710 to the terminal 1 1720, and HARQ feedback that is expected to be transmitted from the terminal 0 1710 to the terminal 1 1720 may be identically configured. In the above-described case, the terminal 0 1710 may not transmit HARQ feedback to the two terminals 1720 and 1730 at the same time.

As another example, when the terminal 0 1710 can simultaneously transmit HARQ feedback to the two terminals 1720 and 1730 based on a terminal implementation, an overlap of resource pool may also be considered. That is, even when the terminal 0 1710 transmits HARQ feedback at the same time, a resource block (RB) transmitting HARQ feedback to two terminals in a same resource pool may have a same location, and a collision may occur based on this.

Figure 19:
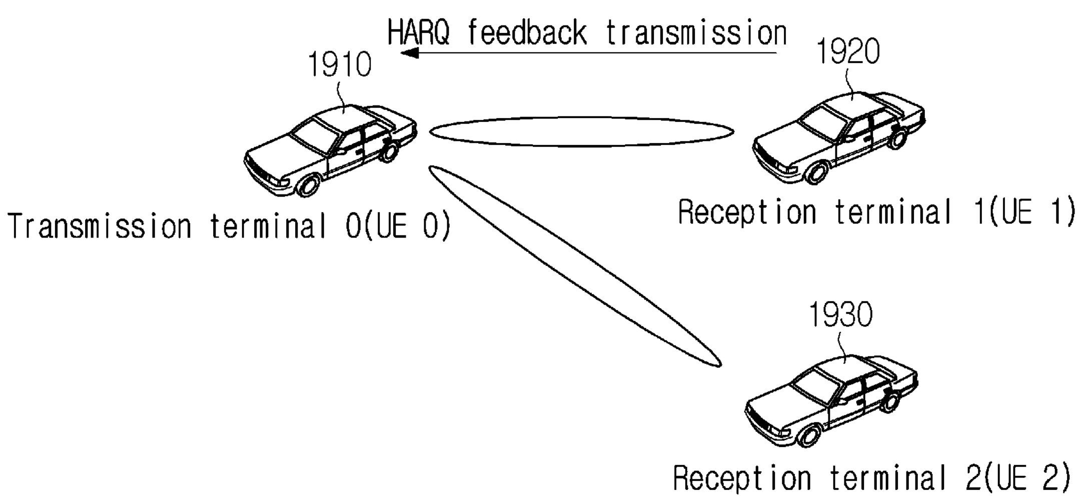
FIG. 19 is a view illustrating a case in which feedback transmission times overlap in a transmission terminal according to an embodiment of the present disclosure.
Figure 20:
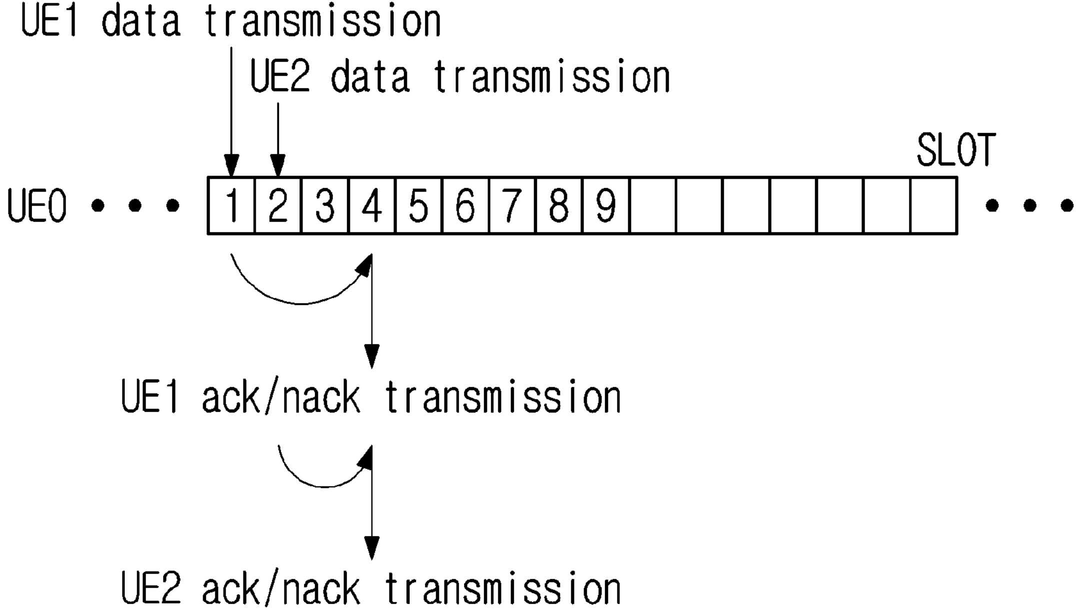
FIG. 20 is a view illustrating a case in which feedback transmission times overlap in a transmission terminal according to an embodiment of the present disclosure.

As another example, FIG. 19 is a view illustrating a case in which feedback transmission times overlap in a transmission terminal according to an embodiment of the present disclosure. Referring to FIG. 19, a terminal 0 (UE 0) 1910 may transmit sidelink data to a terminal 1 (UE 1) 1920 and a terminal 2 (UE 2) 1930 respectively. As an example, referring to FIG. 20, the terminal 0 1910 may transmit sidelink data to the terminal 1 1920 in a slot 1 and transmit sidelink data to the terminal 2 1930 in a slot 2 respectively. Herein, as an example, an expected reception time of HARQ feedback on the sidelink data, which is transmitted to the terminal 1 1920 in the slot 1, may be N+3. That is, HARQ feedback on the sidelink data transmitted to the terminal 1 1920 may be transmitted to the terminal 0 1910 based on a predetermined cycle from a slot 4. Herein, an expected reception time of HARQ feedback on sidelink data, which is transmitted to the terminal 2 1930 in the slot 2, may be N+2. That is, HARQ feedback on the sidelink data transmitted to the terminal 2 1930 may also be transmitted to the terminal 0 1910 based on a predetermined cycle from the slot 4. That is, the terminal 0 1910 needs to receive HARQ feedback simultaneously from the terminal 1 1920 and the terminal 2 1930 in the slot 4. However, as described above, in consideration of a beam alignment, the terminal 0 1910 may receive HARQ feedback from only one terminal, and an efficient feedback scheme may be necessary in this regard. As an example, when HARQ feedback transmissions collide, some HARQ feedback transmissions among the colliding HARQ feedback transmissions may be dropped based on a priority order of data, which will be described below.

In addition, as an example, when a transmission terminal, which transmits data, receives NACK from a reception terminal, the transmission terminal may not recognize a reason for NACK. Specifically, the transmission terminal may recognize a channel environment for a beam direction of the transmission terminal based on directionality of a beam but may not recognize a reception beam channel environment of the reception terminal and not recognize the reason why the data is not received. In consideration of what is described above, the transmission terminal and the reception terminal may conduct a negotiation for resource allocation for sidelink communication. Herein, when the transmission terminal receives NACK, if the transmission terminal receives additional measurement value information for NACK and performs resource reallocation, a reliable transmission and low-latency operation may be possible, and a method for this will be described below.

Figure 18:
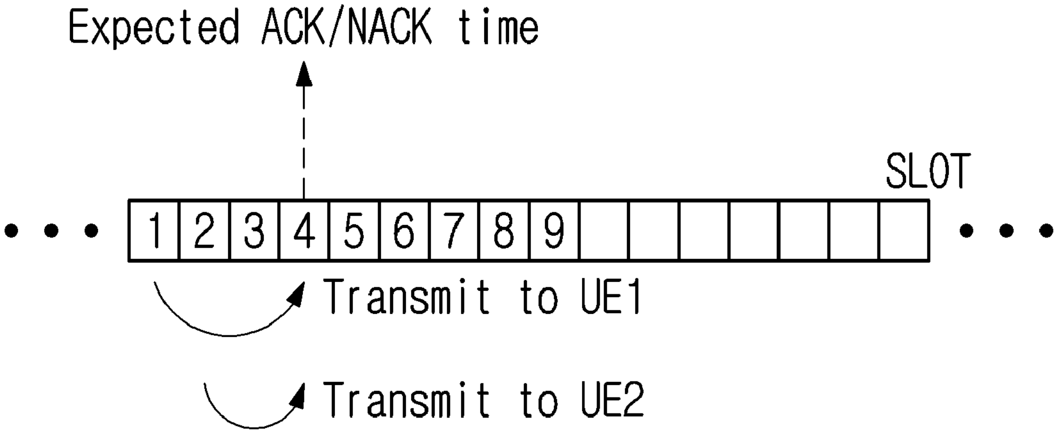
FIG. 18 is a view illustrating a case in which feedback transmission times overlap in a reception terminal according to an embodiment of the present disclosure.

As an example, in FIG. 17 and FIG. 18 described above, a reception terminal may recognize that HARQ feedback timings collide. Herein, the reception terminal may check a priority or QoS (quality of service) of data based on data received from each of transmission terminal. QoS may be known through a service data association protocol (SDAP) layer. Herein, based on the priority described above, the reception terminal may check whether or not transmission at another HARQ feedback time is possible for data with a low priority. Next, the reception terminal may transmit HARQ feedback for data with a high priority based on an existing HARQ feedback transmission time and modify a HARQ feedback transmission time for data with a low priority.

As another example, each of the transmission terminals UE 1 and UE 2 in FIG. 18 may transmit an SCI message including control information through PSCCH before transmitting data to the reception terminal UE 0. Herein, the SCI message may include a field for a negotiation flag. As an example, a negotiation flag field may be 1-bit information indicating whether or not it is possible to modify a HARQ feedback transmission time. As a concrete example, when a negotiation flag field is a first value, it may indicate that a HARQ feedback transmission time for corresponding data can be modified. On the other hand, when the negotiation flag field is a second value, the HARQ feedback transmission time for the corresponding data may not be modified.

Herein, as an example, the transmission terminal may set a negotiation flag value by considering a priority of data but is not limited to the above-described embodiment.

In addition, an SCI field may include a negotiation flag as shown in Table 9. In addition, the SCI field of Table 9 is merely one example, and another field may be added.

TABLE 9

| |
|---|
| priority |
| frequency resource |
| time domain |
| resource reservation |
| DMRS pattern |
| 2 stage SCI format |
| Beta offset |
| DMRS port |
| Modulation and coding scheme |
| Negotiation flag |

As a more concrete example, in case the reception terminal (UE 0) receives SCI with a negotiation flag set to a first value from the transmission terminal 1 (UE 1) and receives SCI with a negotiation flag set to a second value from the transmission terminal 2 (UE 2), when HARQ feedback transmission timing collides, the reception terminal may modify the HARQ feedback transmission timing for the transmission terminal 1 (UE 1). That is, the reception terminal may modify the HARQ feedback transmission time for data of the transmission terminal indicating that the HARQ feedback transmission timing can be modified.

As another example, in case the reception terminal (UE 0) receives SCI with a negotiation flag set to a second value from the transmission terminal 1 (UE 1) and also receives SCI with a negotiation flag set to a second value from the transmission terminal 2 (UE 2), collision of HARQ feedback transmission timing may be considered. That is, the reception terminal may consider a case of indicating that HARQ feedback timing modification is impossible for data of all the transmission terminals. Herein, the reception terminal may modify one of two HARQ feedback transmission times by a priority or QoS of data. The reception terminal may modify any HARQ feedback transmission timing by considering the above-described priority or QoS of data or a terminal implementation issue but is not limited to the above-described embodiment.

As another example, in case the reception terminal (UE 0) receives SCI with a negotiation flag set to a first value from the transmission terminal 1 (UE 1) and also receives SCI with a negotiation flag set to a first value from the transmission terminal 2 (UE 2), when HARQ feedback transmission timing collides, the reception terminal may modify a HARQ feedback transmission time for any data. That is, in case the reception terminal indicates that HARQ feedback transmission timing can be modified for data of all the transmission terminals, the reception terminal may modify any HARQ feedback transmission timing by considering the above-described priority or QoS of data or a terminal implementation issue but is not limited to the above-described embodiment.

Figure 21:
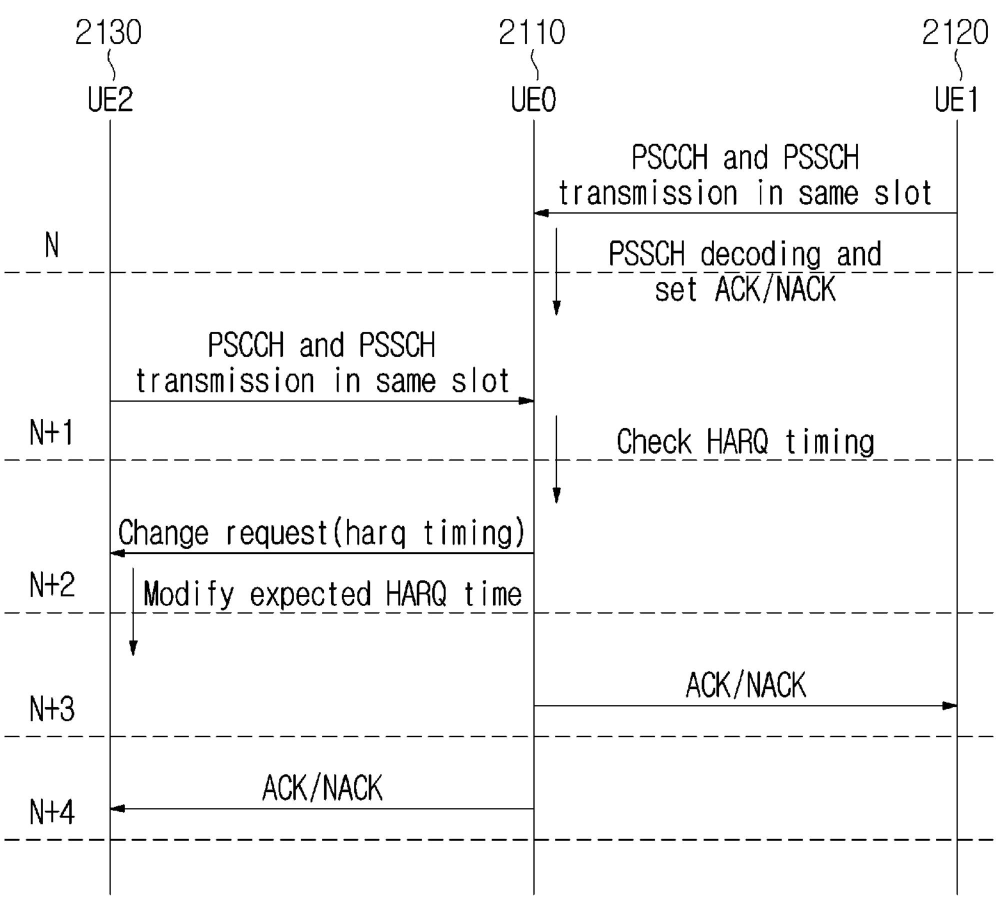
FIG. 21 is a view illustrating a method for performing a negotiation procedure for modifying HARQ feedback according to an embodiment of the present disclosure.

FIG. 21 is a view illustrating a method for performing a negotiation procedure for modifying HARQ feedback according to an embodiment of the present disclosure. Referring to FIG. 21, a reception terminal 0 (UE 0) 2110 may receive sidelink control information and data from a transmission terminal 1 (UE 1) 2120 through PSCCH and PSSCH. As an example, the reception terminal 0 2110 may receive sidelink control information and data in an N slot through PSCCH and PSSCH. Next, the reception terminal 0 2110 may decode the received sidelink data and configure ACK/NACK. In addition, as an example, the reception terminal 0 (UE 0) 2110 may receive sidelink control information and data from a transmission terminal 2 (UE 2) 2130 through PSCCH and PSSCH. As an example, the reception terminal 0 2110 may receive sidelink control information and data in an N+1 slot through PSCCH and PSSCH. At this time, the reception terminal (UE 0) 2110 may check whether or not there is a collision of HARQ feedback transmission timing for the transmission terminal 1 2120 and the transmission terminal 2 2120. Herein, the reception terminal (UE 0) 2110 may configure the HARQ feedback transmission timing to be earlier than an existing time.

As a concrete example, when HARQ feedbacks for the transmission terminal 1 2120 and the transmission terminal 2 2130 respectively are transmitted simultaneously at N+3 time, the reception terminal 2110 may transmit a negotiation message to a transmission terminal with a lower priority at N+1 time. Next, the reception terminal 2110 may transmit HARQ feedback at N+2 time or N+1 time through PSFCH.

As another example, when HARQ feedback transmission is expected simultaneously at N+2 time, the reception terminal may transmit both a negotiation message and a feedback message at N+1 time. That is, the reception terminal 2110 may transmit a negotiation message to a transmission terminal, for which HARQ feedback transmission time needs to be modified, and then transmit a HARQ feedback message. As another example, the reception terminal 2110 may transmit a negotiation message and a HARQ feedback message at a same time to a transmission terminal, for which HARQ feedback transmission time needs to be modified, but is not limited the above-described embodiment. Meanwhile, as an example, data of a transmission terminal, for which HARQ feedback transmission time is not modified, may be transmitted at an existing HARQ feedback transmission time.

Herein, as an example, a negotiation message may be 1-bit information. Specifically, a resource block, which transmits a negotiation message, may be a resource to be preconfigured beforehand based on RRC setting. As an example, a resource, in which a negotiation message is transmitted, may be determined based on Equation 2 below. That is, a resource, in which a negotiation message is transmitted, may be preconfigured beforehand.

$$SL\text{-feedback-Message-}config = \{PRM \text{ location} = \{0 \sim 272\}, \text{ symbol location} = \{1 \sim 8\}\} \quad \text{[Equation 2]}$$

Accordingly, a resource, in which a negotiation message is transmitted, is transmitted to 1RB at a location designated by an upper layer and may be configured by 1 bit. Herein, when the negotiation message has a first value, a transmission terminal may expect that a reception terminal will transmit HARQ feedback at an existing HARQ feedback transmission time. On the other hand, when the negotiation message has a second value, the transmission terminal may transmit HARQ feedback at a location one slot before an existing slot that is the existing HARQ feedback transmission time.

As another example, when the negotiation message has a second value, the transmission terminal may transmit HARQ feedback at a location one slot behind an existing slot that is the existing HARQ feedback transmission time, but is not limited the above-described embodiment.

As another example, information on a time in which a negotiation message is transmitted may be preconfigured based on the above-described layer. Herein, when the negotiation message has a second value, the transmission terminal may transmit HARQ feedback through a modified slot preconfigured through an upper layer in an existing slot as an existing HARQ feedback transmission time, but is not limited to the above-described embodiment.

Figure 22:
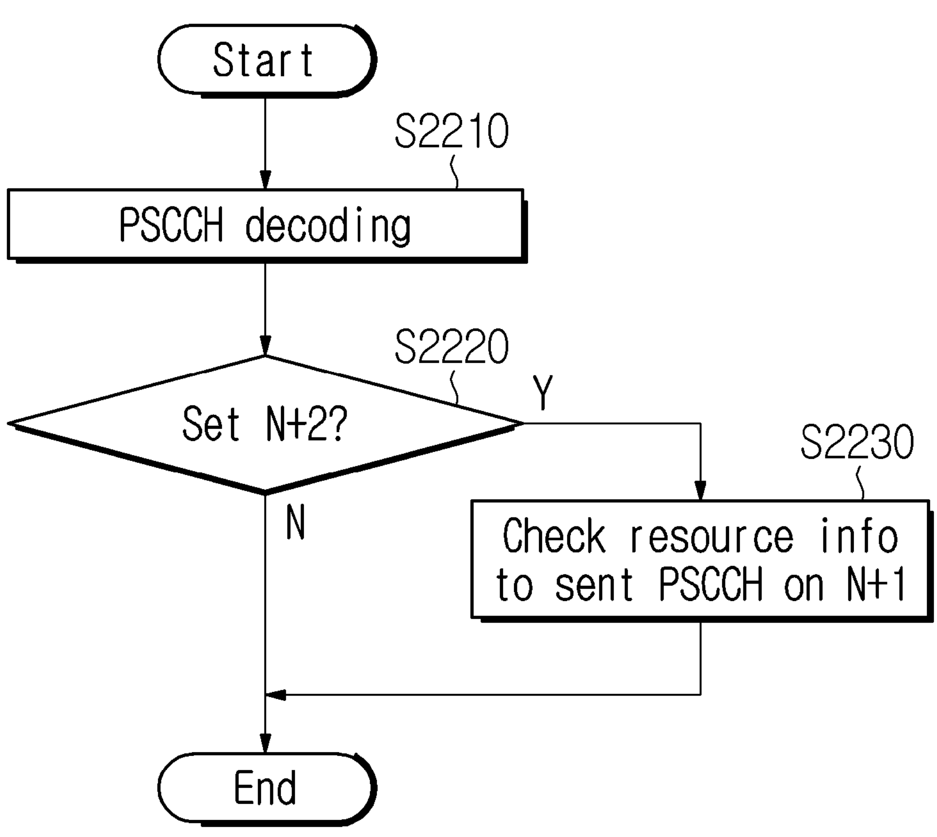
FIG. 22 is a view illustrating a method for performing a negotiation procedure for modifying HARQ feedback according to an embodiment of the present disclosure.

Herein, as a concrete example, referring to FIG. 22, a reception terminal may perform data decoding based on PSCCH and PSSCH that are transmitted by a transmission terminal (S2210). Herein, in case HARQ feedback transmission at N+2 time is set to the reception terminal based on another terminal and the above-described terminal performs HARQ feedback transmission at N+2 time (S2220), the reception terminal may modify the HARQ feedback transmission to N+1 time by checking a transmission resource (S2230) and thus may solve the problem of HARQ feedback transmission collision.

Figure 23:
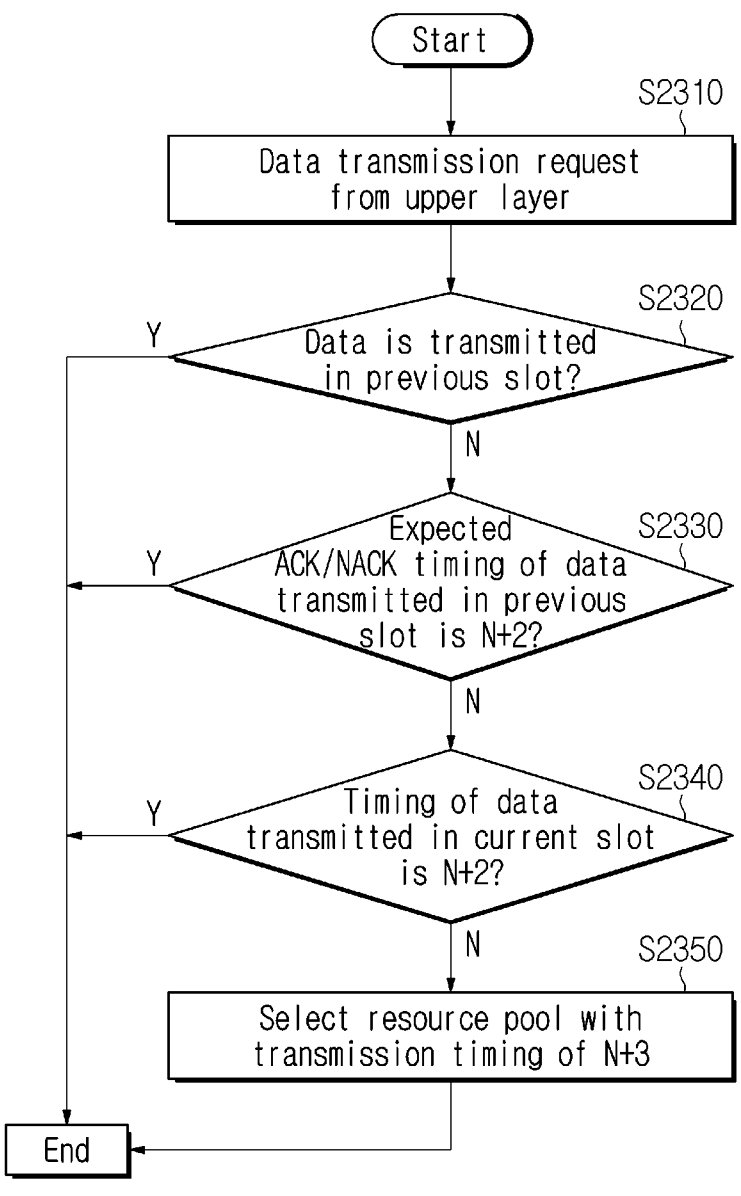
FIG. 23 is a view illustrating an operation of a transmission terminal for modifying a HARQ feedback time according to an embodiment of the present disclosure.

FIG. 23 is a view illustrating an operation of a transmission terminal for modifying a HARQ feedback time according to an embodiment of the present disclosure.

As an example, referring to FIG. 23, it is possible to consider a case in which, after receiving a negotiation message, a transmission terminal receives HARQ feedback temporarily at the time of receiving the negotiation message and then receives HARQ feedback at a same time as before. Herein, in case the transmission terminal receives HARQ feedback at the same time as before, the problem may be that a negotiation message is always received and the time is constantly modified. In consideration of what is described above, the transmission terminal may reselect a resource in a new resource pool.

Specifically, referring to FIG. 23, a transmission terminal may receive a data transmission request from an upper layer (S2310). Herein, the transmission terminal may check whether or not data transmission has been performed in a previous slot (S2320). As an example, when data transmission is performed in the previous slot, the transmission terminal may check whether or not HARQ feedback of the data transmitted in the previous slot is received at N+2 time. Herein, it is possible to consider a case in which the HARQ feedback of data transmitted in the previous slot is not received at N+2 time. As an example, it is possible to consider a case in which the HARQ feedback of data transmitted in the previous slot is transmitted at N+3 time. Herein, the transmission terminal may check whether or not HARQ feedback timing of data transmitted in a current slot is N+2 (S2340). Herein, when HARQ feedback timing of data transmitted in the current slot is N+2, the transmission terminal may newly allocate a resource pool in order to modify the HARQ feedback transmission timing. As an example, the transmission terminal may select a resource pool of which the HARQ feedback transmission timing is N+3 (S2350).

In addition, as an example, when the transmission terminal reallocates a resource based on a negotiation message, a reception terminal may indicate a reallocation resource to the transmission terminal in a negotiating operation. Specifically, since the transmission terminal and the reception terminal are synchronized with each other, they may know information on a same resource pool beforehand. Herein, when transmitting a negotiation message, the reception terminal may newly indicate a resource suitable for a modified feedback time to the transmission terminal. Herein, as an example, the reception terminal may indicate a resource pool number directly to the transmission terminal. That is, the reception terminal may indicate a resource pool number to the transmission terminal, and the transmission terminal may newly select a resource based on the indicated resource pool number. As another example, the reception terminal may provide even a resource available within a resource pool directly to the transmission terminal. Thus, the transmission terminal may newly perform transmission by using a resource that is directly indicated.

Figure 24:
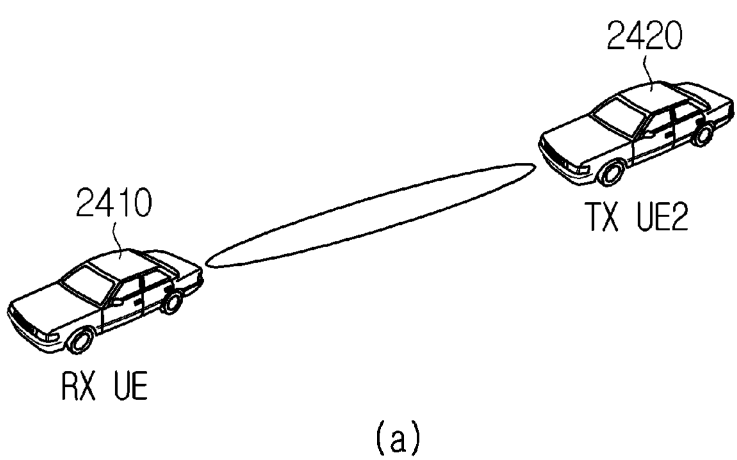
FIG. 24 is a view illustrating a method for performing data retransmission based on NACK according to an embodiment of the present disclosure.
Figure 24:
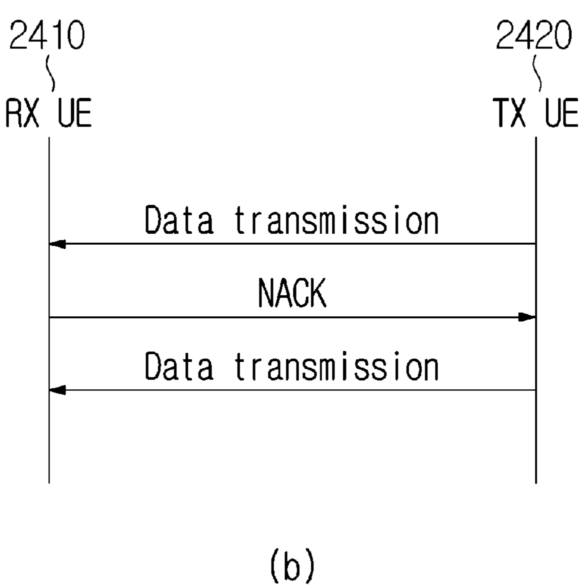

FIG. 24 is a view illustrating a method for performing data retransmission based on NACK according to an embodiment of the present disclosure. As an example, referring to FIG. 24A, a reception terminal 2410 may receive data from a transmission terminal 2420 and, as described above, transmit HARQ feedback to the transmission terminal 2420 through PSFCH. Herein, when the transmission terminal 2420 receives NACK from the reception terminal 2410, the transmission terminal 2420 may retransmit data to the reception terminal 2410, as illustrated in FIG. 24B.

Herein, as an example, it is possible to consider a case in which the transmission terminal 2420 receives NACK as HARQ feedback information on a single resource or a plurality of resources in beam-based transmission based on mmWave. Herein, the transmission terminal 2420 may modify a retransmission resource and enhance the reliability of data transmission by transmitting a grant to the reception terminal 2410. However, as described above, in beam-based transmission, since the transmission terminal 2420 can measure only a beam of the transmission terminal 2420 but cannot measure a channel environment for a beam of the reception terminal 2410, efficient resource selection may be difficult. That is, when the transmission terminal 2420 selects a resource for retransmission after receiving NACK, the transmission terminal 2420 may need to obtain information on a channel environment of a beam of the reception terminal 2410 and select a resource by reflecting the information.

Figure 25:
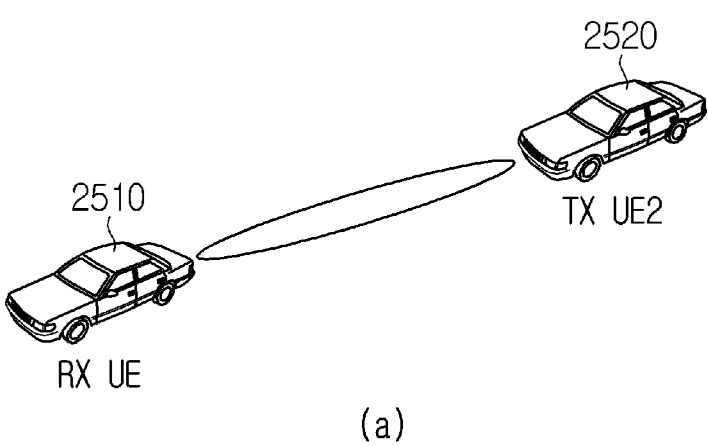
FIG. 25 is a view illustrating a method for sending additional information based on NACK according to an embodiment of the present disclosure.
Figure 25:
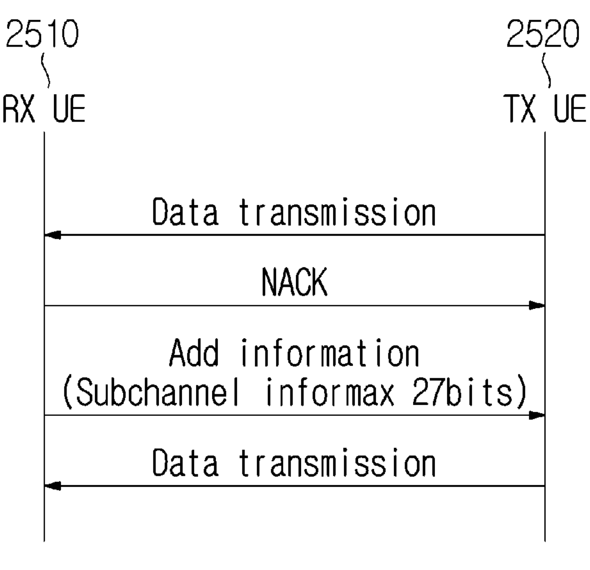

Herein, as an example, FIG. 25 is a view illustrating a method by which a reception terminal sends additional information together with NACK to a transmission terminal according to an embodiment of the present disclosure. Referring to (a) of FIG. 25A and (b) of FIG. 25B, a reception terminal 2510 may receive data from a transmission terminal 2520, and when decoding fails, may transmit NACK to the transmission terminal 2520. Herein, as described above, since the transmission terminal 2510 cannot measure a channel environment of the reception terminal 2510, even when a resource is reselected and a grant is transmitted to the reception terminal 2510, transmission failure may continuously occur. In consideration of what is described above, the reception terminal 2510 may transmit additional information together with NACK to the transmission terminal 2520 in order to reduce latency and enhance the success rate of data retransmission. Herein, the additional information may include candidate resource information.

Specifically, the reception terminal 2510 may know a transmission cycle of data that the transmission terminal 2520 sends. That is, the reception terminal 2510 may know the number of remaining slots in which data is further transmitted and also know a corresponding cycle. Based on the above-described information, the reception terminal 2510 may identify and remove spatial DL data used by the reception terminal 2510 or a resource reservation period allocated by another terminal at the cycle. Accordingly, interference for a remaining resource period may be enhanced in consideration of a beam feature, and the influence of other neighboring terminals may be small.

That is, the reception terminal 2510 may not measure a received signal received power (RSRP) of a period, in which data is allocated, by receiving a PSCCH through blind decoding but remove a subchannel by identify spatial DL data or a resource reservation period allocated by another terminal. Next, the reception terminal 2510 may set a remaining subchannel to a first value. As an example, the first value may be 1. That is, the reception terminal 2510 may select only a subchannel available in the transmission terminal 2520 by considering channel environment information of the reception terminal and mark the corresponding information by the first value. Next, the reception terminal 2510 may include the above-described subchannel information in an additional information message transmitted to the transmission terminal 2520.

Herein, as an example, the subchannel information in the additional information message may be a 27-bit message in a bitmap form. As a more concrete example, when subchannels 1, 2 and 4 are in the idle state and the reception terminal 2510 indicates this to the transmission terminal 2520, the subchannel information "000 00000000 00000000 00001011" may be included in the additional information message and be transmitted to the transmission terminal 2520. Herein, as an example, the reception terminal 2510 may transmit the additional information message through a PSCCH in a slot where the transmission terminal 2520 will perform transmission. As an example, since NACK may be caused by a harsh channel environment, the reception terminal 2510 may transmit an additional information message to the transmission terminal 2520 through a PSSCH based on a 32-bit message. At this time, as an example, since the above-described subchannel information is 27 bits, 5 bits may be reserved. Herein, as an example, in order to check distance information between the reception terminal 2510 and the transmission terminal 2520, information on a zone ID may be included in the reserved bits, and they may be transmitted to the transmission terminal 2520. As another example, the reserved bits of the additional information message may include speed information, so that the mobility of terminals may be determined. Next, when the transmission terminal 2520 receives the additional information message from the reception terminal 2510, the transmission terminal 2520 may identify the above-described subchannel period. Herein, since the above-described period may be a period from which spatial DL data or a resource reservation period allocated from another terminal is removed, interference may be low. In addition, in the above-described period, the transmission terminal 2520 may identify a subchannel period in which the transmission terminal 2520 may be affected by interference of other terminals. That is, by considering interference affecting the transmission terminal 2520, a subchannel period, which can be subject to the interference in a corresponding period, may be removed, and retransmission may be performed based on the remaining period. That is, the transmission terminal 2520 may identify a period forming an intersection of a subchannel period based on a Tx configuration list and thus may perform retransmission.

Figure 26:
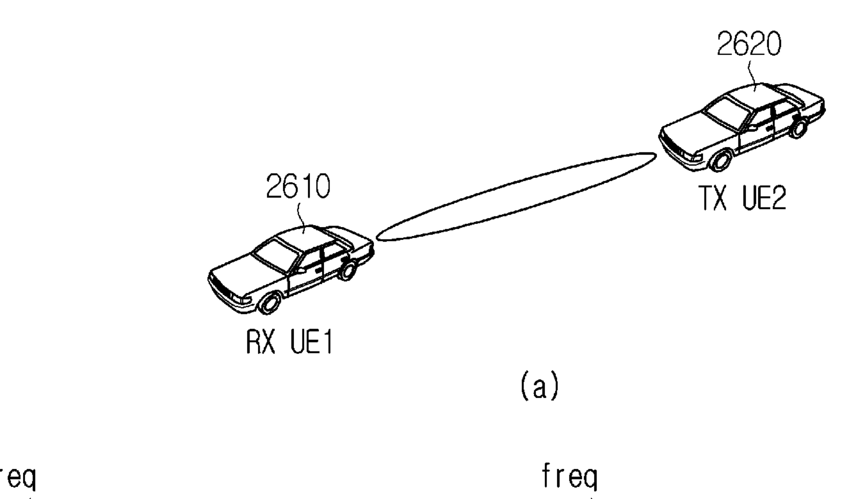
FIG. 26 is a view illustrating an operating method for resource reallocation considering a zone ID according to an embodiment of the present disclosure.
Figure 26:
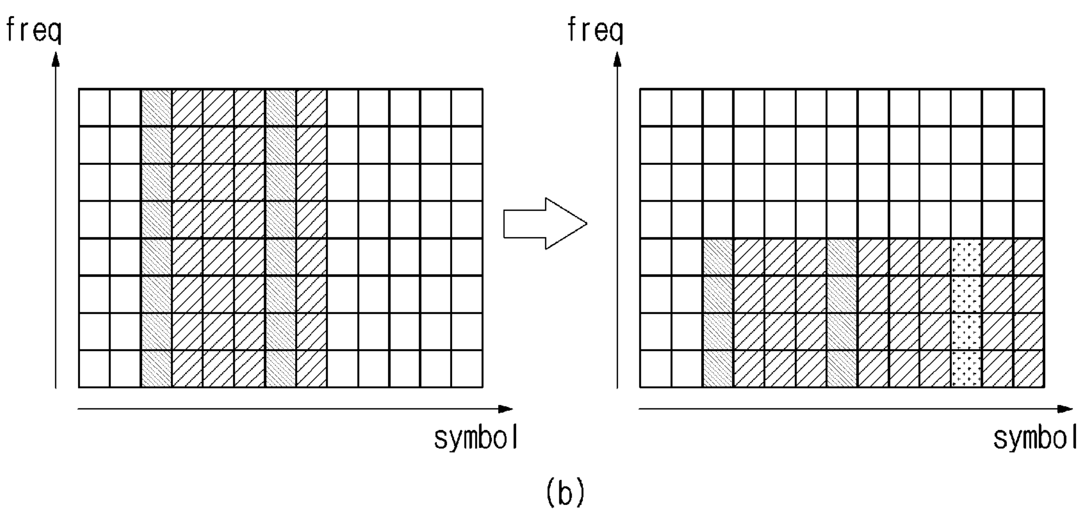

FIG. 26 is a view illustrating an operating method for resource reallocation considering a zone ID according to an embodiment of the present disclosure.

As described above, a transmission terminal may reallocate a resource for retransmission. Herein, as an example, the resource may be reallocated by considering a zone ID. As an example, referring to (a) of FIG. 26 and (b) of FIG. 36, information on a distance between a reception terminal 2610 and a transmission terminal 2620 may be identified based on a zone ID of the reception terminal 2610 and a zone ID of the transmission terminal 2620. Herein, as an example, in case there is a long distance between the reception terminal 2610 and the transmission terminal 2620, the transmission terminal 2620 may reduce a modulation coding scheme (MCS) in order to ensure reliable transmission.

Herein, even when the MCS is reduced, since a transport block (TB) size may have to be the same, a length of RB may be increased. In consideration of the above-described case, when the transmission terminal 2620 performs retransmission, it may be necessary to retransmit data by allocating a new subchannel.

Herein, as an example, the above-described additional information message may include zone ID information, and the transmission terminal 2620 may identify a relative distance based on zone ID information of the reception terminal 2610 and its own zone ID information. As a more concrete example, whether or not to reduce a MCS may be determined based on a preconfigured threshold value of a relative distance. That is, when a relative distance is equal to or below a threshold value, the transmission terminal 2620 may perform transmission by reallocating a resource based on an indicated subchannel, as described above. On the other hand, when the relative distance exceeds the threshold value, the transmission terminal 2620 may retransmit data by selecting a new subchannel but is not limited to the above-described embodiment.

As another example, a retransmission resource may be selected by considering a relative speed. Herein, when the relative speed is fast, the reception terminal 2610 may receive a signal with inter-carrier interference (ICI) based on the Doppler effect and thus fail in decoding. Accordingly, the reception terminal 2610 may transmit NACK to the transmission terminal 2620. Herein, the transmission terminal 2620 may identify the speed of the reception terminal 2610 and calculate the relative speed. As an example, speed information may be included in the above-described additional information message but is not limited to the above-described embodiment. Herein, the transmission terminal 2620 may identify a length of a symbol, in which the Doppler effect may occur, based on information on the relative speed, and configure the symbol to be long enough to many DMRSs, but is not limited the above-described embodiment.

Figure 27:
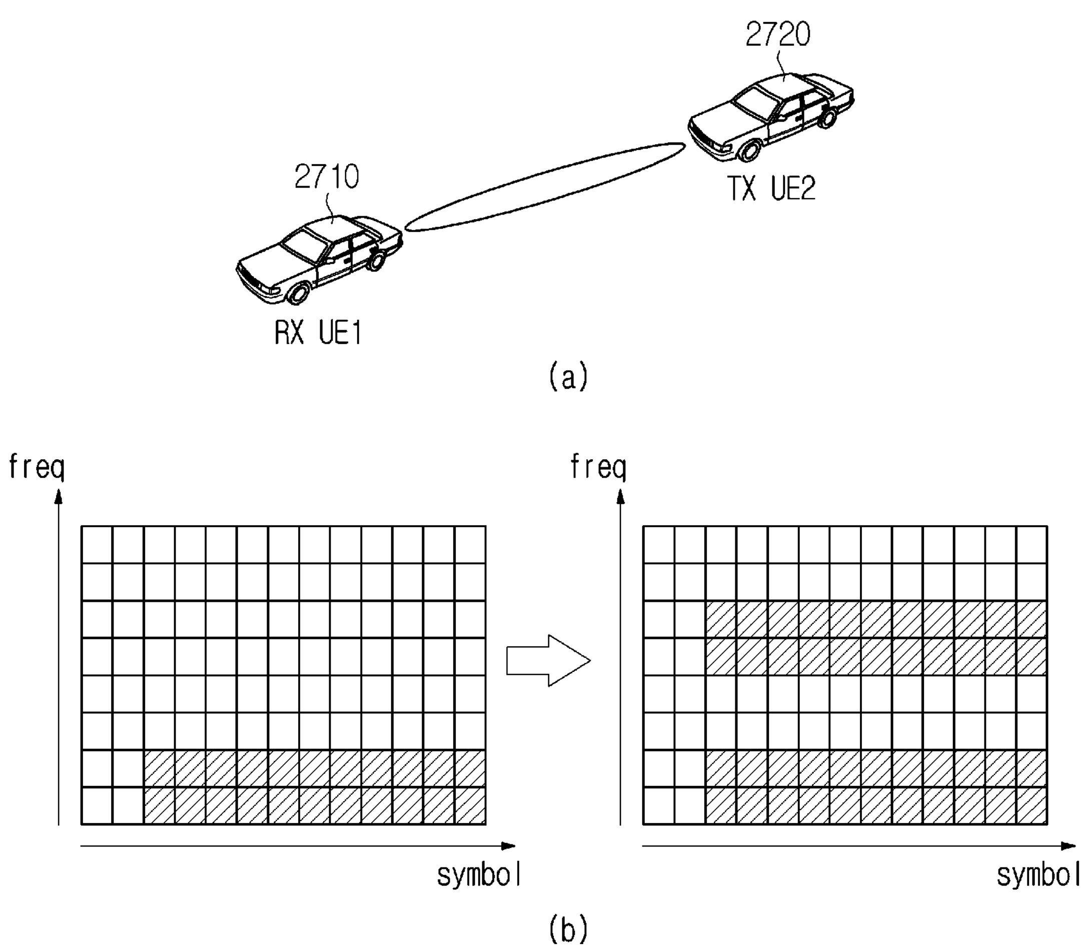
FIG. 27 is a view illustrating a method for performing resource reallocation in different subchannels according to an embodiment of the present disclosure.

As another example, after receiving the additional information message, the transmission terminal 2620 may send retransmission data. When the presence of multiple subchannels is recognized, a same message may be transmitted simultaneously not only in an existing location but also in other subchannels, and thus the reliability of transmission may be enhanced. As a more concrete example, referring to (a) of FIG. 27 and (b) of FIG. 27, a transmission terminal 2720 may transmit same data to a reception terminal 2710 in different subchannels. Herein, in SCI that is transmitted by the transmission terminal 2720, NDI may be configured to be retransmitted, and the same data may be transmitted to the reception terminal 2710.

Figure 28:
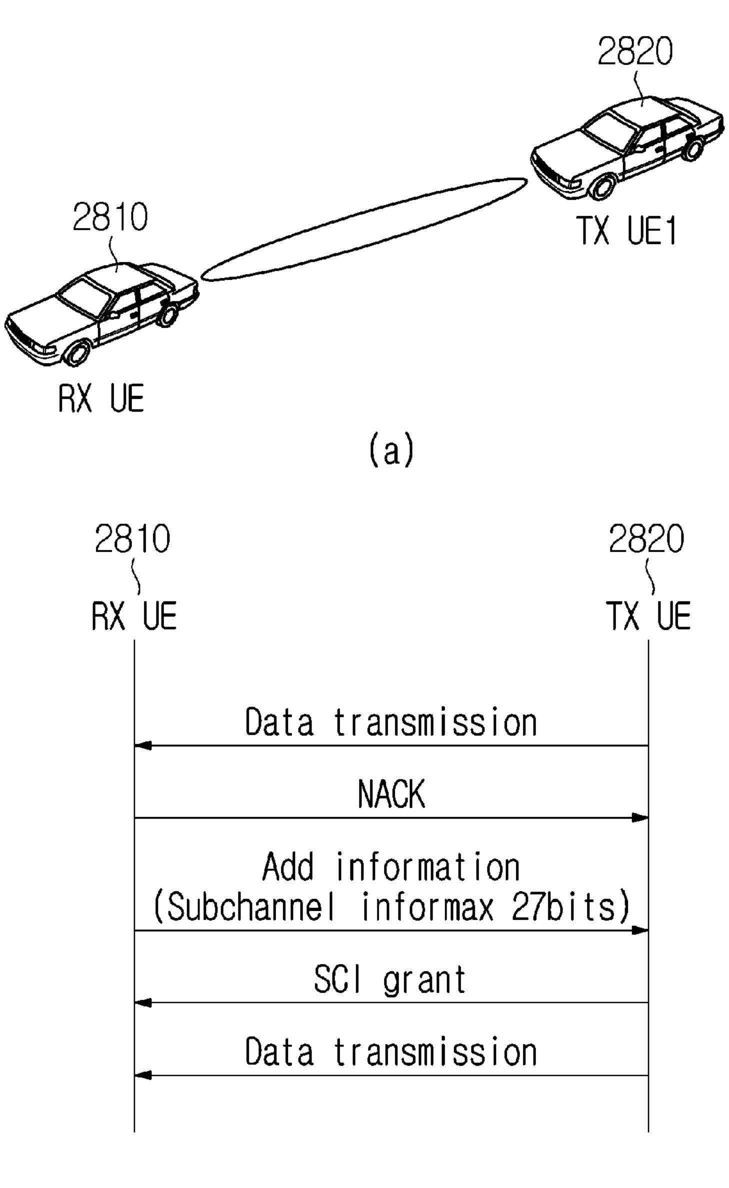
FIG. 28 is a view illustrating a case in which a transmission terminal fails to receive NACK from a reception terminal according to an embodiment of the present disclosure.

FIG. 28 is a view illustrating a case in which a transmission terminal fails to receive NACK from a reception terminal according to an embodiment of the present disclosure.

As an example, referring to (a) of FIG. 28 and (b) of FIG. 28, when a reception terminal 2810 fails to decode data transmission of a transmission terminal 2820, the reception terminal 2810 may transmit NACK. Herein, it is possible to consider a case in which the reception terminal 2810 transmits NACK to the transmission terminal 2820 but the transmission terminal 2820 does not receive NACK. In addition, it is possible to consider a case in which the transmission terminal 2820 does not receive the above-described additional information message.

Specifically, it is possible to consider a case in which the transmission terminal 2820 receives NACK from the reception terminal 2810 but does not receive an additional information message. Herein, since the transmission terminal 2820 has received NACK alone, the transmission terminal 2820 may perform retransmission by using an existing resource as it is. In addition, as an example, when there is an additional RB available in a same subchannel, the transmission terminal 2820 may perform data retransmission by using the RB together, but is not limited to the above-described embodiment.

As another example, it is possible to consider a case in which the transmission terminal 2820 does not receive NACK but only an additional information message. Herein, as an example, since the transmission of the additional information message means that the reception terminal 2810 fails in transmission, the transmission terminal 2820 may assume NACK and perform retransmission by a subchannel based on the additional information message. Herein, as an example, in consideration of what is described above, the reception terminal 2810 may not transmit NACK in case of failure in data decoding but transmit only an additional information message, and the present disclosure is not limited to the above-described embodiment.

As another example, when the transmission terminal 2820 fails to receive both NACK and the additional information message, the transmission terminal 2820 may perform retransmission based on an existing configuration. That is, when the transmission terminal 2820 does not receive NACK as well as ACK, the failure of transmission may be determined, and since the additional information message is not received either, transmission failure may be determined. Accordingly, the transmission terminal 2820 may perform retransmission by using an existing resource as it is. In addition, as an example, when there is an additional RB available in a same subchannel, the transmission terminal 2820 may perform data retransmission by using the RB together, but is not limited to the above-described embodiment.

Next, the transmission terminal 2820 may indicate resource information for retransmission to the reception terminal 2820 through a SCI grant and perform retransmission.

Figure 29:
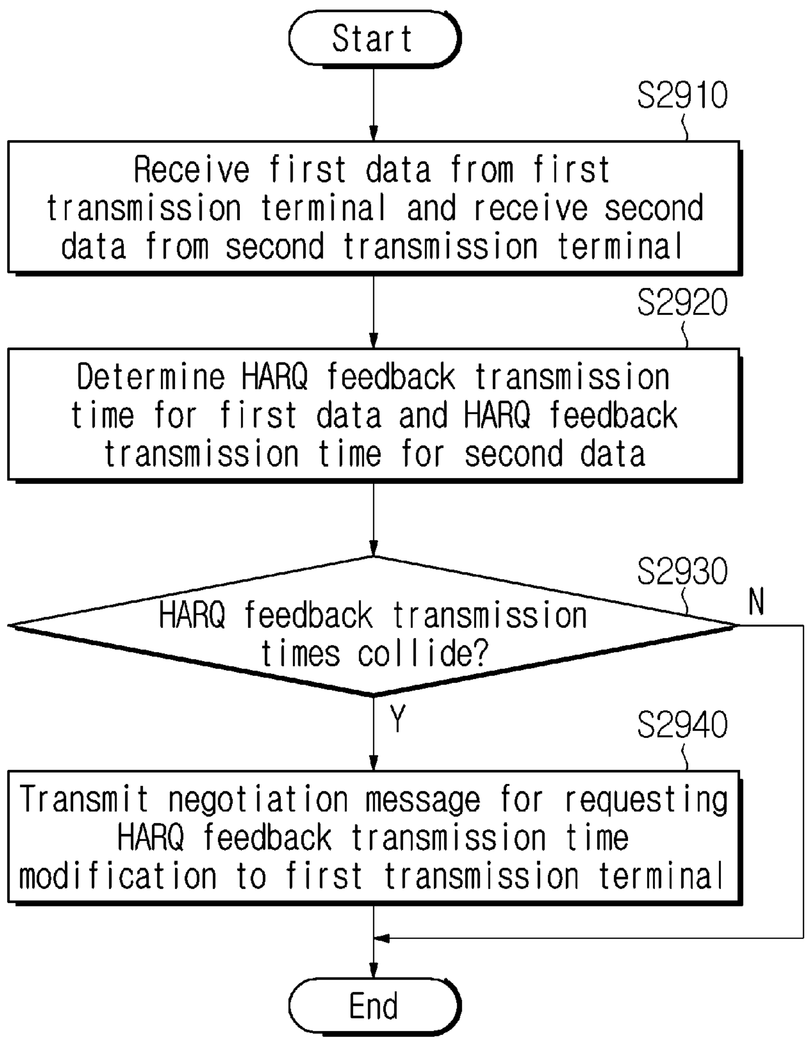
FIG. 29 is a view illustrating a method for modifying a HARQ feedback transmission time according to an embodiment of the present disclosure.

FIG. 29 is a view illustrating a method for modifying a HARQ feedback transmission time according to an embodiment of the present disclosure.

Referring to FIG. 29, a reception terminal may receive first data from a first transmission terminal and second data from a second transmission terminal (S2910). Herein, the reception terminal and the first transmission terminal may be aligned in a first beam, and the reception terminal and the second transmission terminal may be aligned in a second beam. Herein, the first beam and the second beam may be different from each other. Accordingly, the reception terminal may not exchange a signal with the first transmission terminal and the second transmission terminal at a same time. Herein, based on resource pool information and PSFCH configuration information based on an upper layer configuration, HARQ feedback transmission times for the first transmission terminal and the second transmission terminal respectively may be determined (S2920). Herein, when there is a collision between a HARQ feedback transmission time for the first data and a HARQ feedback transmission time for the second data (S2930), the reception terminal may transmit a negotiation message for requesting to modify the HARQ feedback transmission time to the first transmission terminal (S2940). Herein, as an example, the reception terminal may receive first SCI, which include a negotiation flag field, together with the first data from the first transmission terminal. In addition, the reception terminal may receive second SCI, which includes a negotiation flag bit, together with the second data from the second transmission terminal. Herein, when the negotiation flag field is a first value, the negotiation flag field may indicate that the HARQ feedback transmission time can be modified. On the other hand, when the negotiation flag field is a second value, the negotiation flag field may indicate that the HARQ feedback transmission time cannot be modified.

Herein, as an example, as SCI that the reception terminal receives from the first transmission terminal and the second transmission terminal, a negotiation flag field of first SCI may be set to a first value, and a negotiation flag field of second SCI may be set to a second value. That is, the HARQ feedback transmission time of the first transmission terminal may be indicated to be modifiable, and the HARQ feedback transmission time of the second transmission terminal may be indicated to be unmodifiable. Herein, the reception terminal may transmit a negotiation message for modifying the HARQ feedback transmission time to the first transmission terminal which is capable of modifying the HARQ feedback transmission time.

As another example, it is possible to consider a case in which both the negotiation flag field of first SCI and the negotiation flag field of second SCI are set to the second value. That is, for all the transmission terminals, impossibility of modifying a HARQ feedback transmission time may be indicated. However, since a HARQ feedback collision occurs, the reception terminal needs to modify a transmission time for one of the first data and the second data. Herein, as an example, based on a priority order, the reception terminal may transmit a negotiation message to the first transmission terminal in order to modify the HARQ feedback transmission time for the first data with a lower priority, but may not be limited thereto.

Herein, a resource for transmitting the negotiation message may be determined based on the upper layer setting, and the negotiation message may be 1-bit information indicating whether or not a HARQ feedback transmission time is to be modified. In addition, as an example, when the negotiation message indicates modification of the HARQ feedback transmission time for the first data, the HARQ feedback transmission time for the first data may be transmitted one slot before the determined HARQ feedback transmission time.

Herein, in consideration of an operation of the transmission terminal, the transmission terminal may transmit the first data to the reception terminal. Next, the transmission terminal may receive, from the reception terminal, a negotiation message for indicating that the HARQ feedback transmission time for the first data is modified. That is, the transmission terminal itself cannot check whether or not the HARQ feedback transmission time collides with another transmission terminal, but may modify the HARQ feedback transmission time based on the negotiation message that is transmitted by the reception terminal.

As an example, as described above, the reception terminal may receive the second data from another transmission terminal aligned by the first beam and, when the HARQ feedback transmission time for the first data and the HARQ feedback transmission time for the second data are identical with each other, may transmit, to the transmission terminal, a negotiation message for indicating modification of the HARQ feedback transmission time. Herein, the HARQ feedback transmission time of the transmission terminal may be determined based on the resource pool information and PSFCH configuration information of a RRC layer configuration. In addition, as an example, the transmission terminal may transmit first SCI as well as the first data to the reception terminal, and the first SCI may include a negotiation flag field. Herein, as described above, when the negotiation flag field is a first value, the negotiation flag field may indicate that the HARQ feedback transmission time can be modified, and when the negotiation flag field is a second value, the negotiation flag field may indicate that the HARQ feedback transmission time cannot be modified. Herein, as described above, the transmission terminal, which receives the negotiation message from the reception terminal, may set the negotiation flag field to the first value and transmit it to the reception terminal. In addition, as an example, as described above, the transmission terminal may receive the negotiation message through a resource that is preconfigured based on a RRC layer, and the negotiation message may be configured as 1-bit information indicating whether or not the HARQ feedback transmission time is modified. In addition, when the negotiation message indicates modification of the HARQ feedback transmission time for the first data, the transmission terminal may transmit the HARQ feedback transmission time for the first data one slot before the determined HARQ feedback transmission time.

Figure 30:
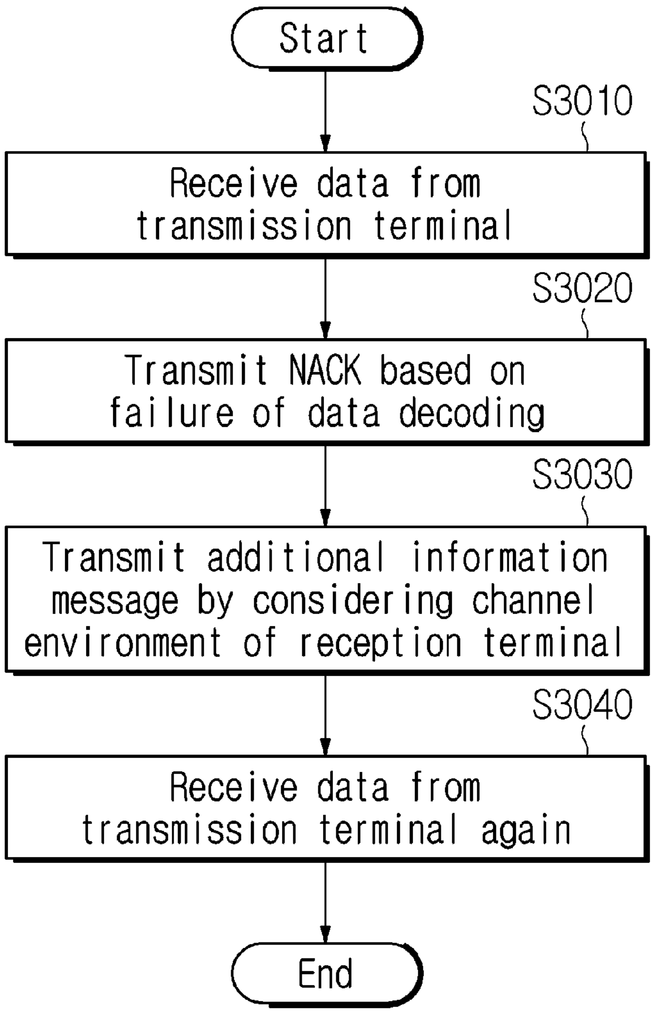
FIG. 30 is a view illustrating a method by which a reception terminal sends an additional information message together with NACK according to an embodiment of the present disclosure.

FIG. 30 is a view illustrating a method by which a reception terminal sends an additional information message together with NACK according to an embodiment of the present disclosure.

Referring to FIG. 30, a reception terminal may receive sidelink data from a transmission terminal (S3010). Next, when failing to decode the data transmitted by the transmission terminal, the reception terminal may transmit NACK to the transmission terminal (S3020). However, as described above, the transmission terminal may recognize a channel environment for a beam of the transmission terminal but may not recognize a channel environment for a beam of the reception terminal. Accordingly, even when the transmission terminal performs retransmission based on an existing configuration, reliable transmission may not be ensured. Herein, since the reception terminal and the transmission terminal share resource pool information and other configuration information for sidelink communication, the reception terminal may recognize resource reservation information of the transmission terminal. Herein, as an example, the reception terminal may identify and remove spatial DL data or a resource reservation period allocated by another terminal in a period where the transmission terminal performs data transmission. That is, resources, in which interference occurs, may be removed by considering the channel environment of the reception terminal. Next, as described above, the reception terminal may include subchannel information, which is configured by considering channel environment, in an additional information message and transmit the additional information message to the transmission terminal (S3030). Next, as described above, the transmission terminal may select a resource by using the subchannel information in the additional information message and retransmit data to the reception terminal (S3040).

Systems and Devices to which Embodiments of the Present Disclosure are Applicable Embodiments of the present disclosure may be combined with each other.

Hereinafter, an apparatus to which various embodiments of the present disclosure may be applied will be described. Although not limited thereto, various descriptions, functions, procedures, proposals, methods, and/or flow charts disclosed herein may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 31:
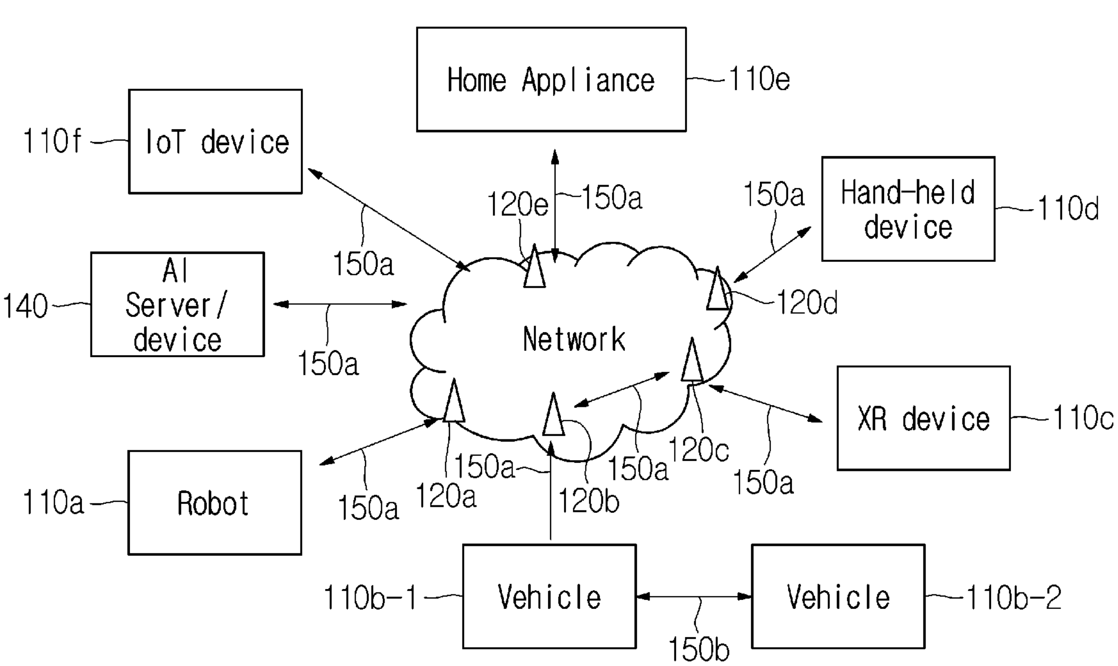
FIG. 31 illustrates an example of a communication system according to an embodiment of the present disclosure.

FIG. 31 illustrates a communication system applicable to the present disclosure. The embodiment of FIG. 31 may be combined with various embodiments of the present disclosure.

Referring to FIG. 31, the communication system applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include at least one of a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an artificial intelligence (AI) device/server 100*g*. For example, the vehicles may include a vehicle having a wireless communication function, an autonomous vehicle, a vehicle capable of performing vehicle-to-vehicle communication, etc. The vehicles 100*b*-1 and 100*b*-2 may include an unmanned aerial vehicle (UAV) (e.g., a drone). The XR device 100*c* includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100*d* may include a smartphone, a smart pad, a wearable device (e.g., a smart watch or smart glasses), a computer (e.g., a laptop), etc. The home appliance 100*e* may include a TV, a refrigerator, a washing machine, etc. The IoT device 100*f* may include a sensor, a smart meter, etc. For example, the base station 120*a* to 120enetwork may be implemented by a wireless device, and a specific wireless device 120*a* may operate as a base station/network node for another wireless device.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network through the base station 120. AI technology is applicable to the wireless devices 100*a* to 100*f*, and the wireless devices 100*a* to 100*f* may be connected to the AI server 100*g* through the network. The network may be configured using a 3G network, a 4G (e.g., LTE) network or a 5G (e.g., NR) network, etc. The wireless devices 100*a* to 100*f* may communicate with each other through the base stations 120*a* to 120*e* or perform direct communication (e.g., sidelink communication) without through the base stations 120*a* to 120*e*. For example, the vehicles 100*b*-1 and 100*b*-2 may perform direct communication (e.g., vehicle to vehicle (V2V)/vehicle to everything (V2X) communication). In addition, the IoT device 100*f* (e.g., a sensor) may perform direct communication with another IoT device (e.g., a sensor) or the other wireless devices 100*a* to 100*f*.

Wireless communications/connections 150*a*, 150*b* and 150*c* may be established between the wireless devices 100*a* to 100*f*/the base stations 120*a* to 120*e* and the base stations 120*a* to 120*e*/the base stations 120*a* to 120*e*. Here, wireless communication/connection may be established through various radio access technologies (e.g., 5G NR) such as uplink/downlink communication 150*a*, sidelink communication 150*b* (or D2D communication) or communication 150*c* between base stations (e.g., relay, integrated access backhaul (IAB). The wireless device and the base station/wireless device or the base station and the base station may transmit/receive radio signals to/from each other through wireless communication/connection 150*a*, 150*b* and 150*c*. For example, wireless communication/connection 150*a*, 150*b* and 150*c* may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Figure 32:
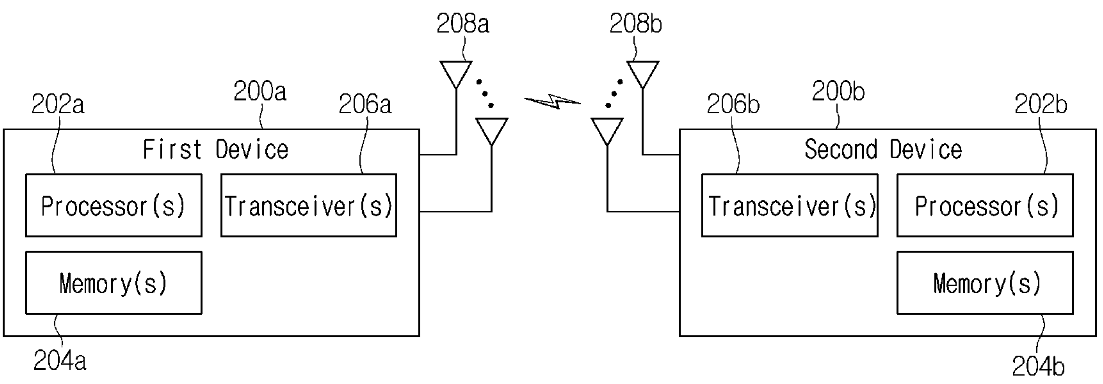
FIG. 32 shows an example of a wireless device according to an embodiment of the present disclosure.

FIG. 32 illustrates wireless devices applicable to the present disclosure. The embodiment of FIG. 32 may be combined with various embodiments of the present disclosure.

Referring to FIG. 32, a first wireless device 200*a* and a second wireless device 200*b* may transmit and receive radio signals through various radio access technologies (e.g., LTE or NR). Here, {the first wireless device 200*a*, the second wireless device 200*b*} may correspond to {the wireless device 100*x*, the base station 120} and/or {the wireless device 100*x*, the wireless device 100*x*} of FIG. 31.

The first wireless device 200*a* may include one or more processors 202*a* and one or more memories 204*a* and may further include one or more transceivers 206*a* and/or one or more antennas 208*a*. The processor 202*a* may be configured to control the memory 204*a* and/or the transceiver 206*a* and to implement descriptions, functions, procedures, proposals, methods and/or operational flowcharts disclosed herein. For example, the processor 202*a* may process information in the memory 204*a* to generate first information/signal and then transmit a radio signal including the first information/signal through the transceiver 206*a*. In addition, the processor 202*a* may receive a radio signal including second information/signal through the transceiver 206*a* and then store information obtained from signal processing of the second information/signal in the memory 204*a*. The memory 204*a* may be coupled with the processor 202*a*, and store a variety of information related to operation of the processor 202*a*. For example, the memory 204*a* may store software code including instructions for performing all or some of the processes controlled by the processor 202*a* or performing the descriptions, functions, procedures, proposals, methods and/or operational flowcharts disclosed herein. Here, the processor 202*a* and the memory 204*a* may be part of a communication modem/circuit/chip designed to implement wireless communication technology (e.g., LTE or NR). The transceiver 206*a* may be coupled with the processor 202*a* to transmit and/or receive radio signals through one or more antennas 208*a*. The transceiver 206*a* may include a transmitter and/or a receiver. The transceiver 206*a* may be used interchangeably with a radio frequency (RF) unit. In the present disclosure, the wireless device may refer to a communication modem/circuit/chip.

The second wireless device 200*b* may perform wireless communications with the first wireless device 200*a* and may include one or more processors 202*b* and one or more memories 204*b* and may further include one or more transceivers 206*b* and/or one or more antennas 208*b*. The functions of the one or more processors 202*b*, one or more memories 204*b*, one or more transceivers 206*b*, and/or one or more antennas 208*b* are similar to those of one or more processors 202*a*, one or more memories 204*a*, one or more transceivers 206*a* and/or one or more antennas 208*a* of the first wireless device 200*a*.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs), one or more service data unit (SDU), messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be coupled with one or more processors 202*a* and 202*b* to store various types of data, signals, messages, information, programs, code, instructions and/or commands One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be coupled with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. In addition, one or more transceivers 206*a* and 206*b* may be coupled with one or more antennas 208*a* and 208*b*, and may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Figure 33:
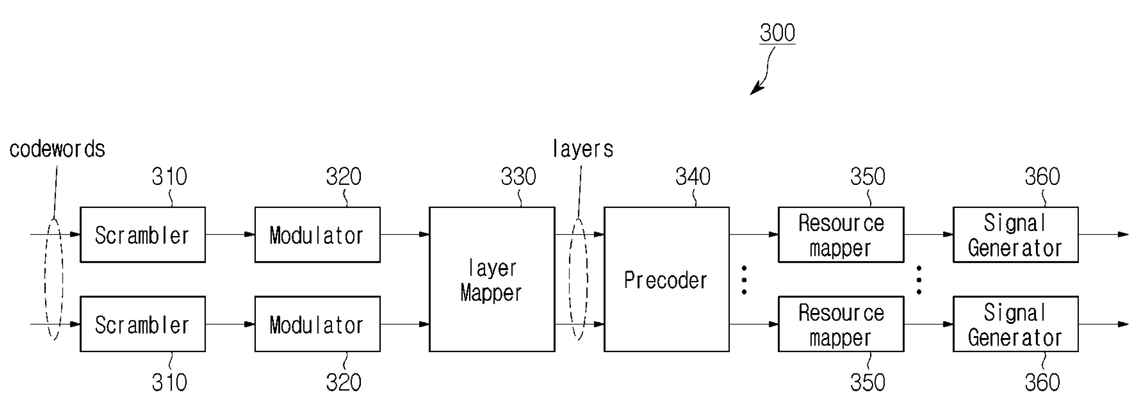
FIG. 33 illustrates a circuit for processing a transmitted signal according to an embodiment of the present disclosure.

FIG. 33 illustrates a signal process circuit for a transmission signal applicable to the present disclosure. The embodiment of FIG. 33 may be combined with various embodiments of the present disclosure.

Referring to FIG. 33, a signal processing circuit 300 may include scramblers 310, modulators 320, a layer mapper 330, a precoder 340, resource mappers 350, and signal generators 360. For example, an operation/function of FIG. 33 may be performed by the processors 202*a* and 202*b* and/or the transceivers 36 and 206 of FIG. 32. Hardware elements of FIG. 33 may be implemented by the processors

202*a* and 202*b* and/or the transceivers 36 and 206 of FIG. 32. For example, blocks 310 to 360 may be implemented by the processors 202*a* and 202*b* of FIG. 32. Alternatively, the blocks 310 to 350 may be implemented by the processors 202*a* and 202*b* of FIG. 32 and the block 360 may be implemented by the transceivers 36 and 206 of FIG. 32, and it is not limited to the above-described embodiment.

Codewords may be converted into radio signals via the signal processing circuit 300 of FIG. 33. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 310. Scramble sequences used for scrambling may be generated based on an initialization value, and the initialization value may include ID information of a wireless device. The scrambled bit sequences may be modulated to modulation symbol sequences by the modulators 320. A modulation scheme may include pi/2-Binary Phase Shift Keying (pi/2-BPSK), m-Phase Shift Keying (m-PSK), and m-Quadrature Amplitude Modulation (m-QAM).

Complex modulation symbol sequences may be mapped to one or more transport layers by the layer mapper 330. Modulation symbols of each transport layer may be mapped (precoded) to corresponding antenna port(s) by the precoder 340. Outputs z of the precoder 340 may be obtained by multiplying outputs y of the layer mapper 330 by an N*M precoding matrix W. Herein, N is the number of antenna ports and M is the number of transport layers. The precoder 340 may perform precoding after performing transform precoding (e.g., DFT) for complex modulation symbols. Alternatively, the precoder 340 may perform precoding without performing transform precoding.

The resource mappers 350 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 360 may generate radio signals from the mapped modulation symbols and the generated radio signals may be transmitted to other devices through each antenna. For this purpose, the signal generators 360 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures of FIG. 33. For example, the wireless devices (e.g., 200*a* and 200*b* of FIG. 32) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 34 illustrates a wireless device applicable to the present disclosure. The embodiment of FIG. 34 may be combined with various embodiments of the present disclosure.

Referring to FIG. 34, a wireless device 300 may correspond to the wireless devices 200*a* and 200*b* of FIG. 32 and include various elements, components, units/portions and/or modules. For example, the wireless device 300 may include a communication unit 310, a control unit (controller) 320, a memory unit (memory) 330 and additional components 340.

The communication unit 410 may include a communication circuit 412 and a transceiver(s) 414. The communication unit 410 may transmit and receive signals (e.g., data, control signals, etc.) to and from other wireless devices or base stations. For example, the communication circuit 412 may include one or more processors 202*a* and 202*b* and/or one or more memories 204*a* and 204*b* of FIG. 32. For example, the transceiver(s) 414 may include one or more transceivers 206*a* and 206*b* and/or one or more antennas 208*a* and 208*b* of FIG. 42.

The control unit 420 may be composed of at least one processor set. For example, the control unit 420 may be composed of a set of a communication control processor, an application processor, an electronic control unit (ECU), a graphic processing processor, a memory control processor, etc. The control unit 420 may be electrically coupled with the communication unit 410, the memory unit 430 and the additional components 440 to control overall operation of the wireless device. For example, the control unit 420 may control electrical/mechanical operation of the wireless device based on a program/code/instruction/information stored in the memory unit 430. In addition, the control unit 420 may transmit the information stored in the memory unit 430 to the outside (e.g., another communication device) through the wireless/wired interface using the communication unit 410 over a wireless/wired interface or store information received from the outside (e.g., another communication device) through the wireless/wired interface using the communication unit 410 in the memory unit 430.

The memory unit 430 may be composed of a random access memory (RAM), a dynamic RAM (DRAM), a read only memory (ROM), a flash memory, a volatile memory, a non-volatile memory and/or a combination thereof. The memory unit 430 may store data/parameters/programs/codes/commands necessary to derive the wireless device 400. In addition, the memory unit 430 may store input/output data/information, etc.

The additional components 440 may be variously configured according to the types of the wireless devices. For example, the additional components 440 may include at least one of a power unit/battery, an input/output unit, a driving unit or a computing unit. Without being limited thereto, the wireless device 400 may be implemented in the form of the robot (FIG. 41, 100*a*), the vehicles (FIGS. 41, 100*b*-1 and 100*b*-2), the XR device (FIG. 41, 100*c*), the hand-held device (FIG. 41, 100*d*), the home appliance (FIG. 41, 100*e*), the IoT device (FIG. 41, 100*f*), a digital broadcast terminal, a hologram apparatus, a public safety apparatus, an MTC apparatus, a medical apparatus, a Fintech device (financial device), a security device, a climate/environment device, an AI server/device (FIG. 41, 140), the base station (FIG. 41, 120), a network node, etc. The wireless device may be movable or may be used at a fixed place according to use example/service.

Figure 35:
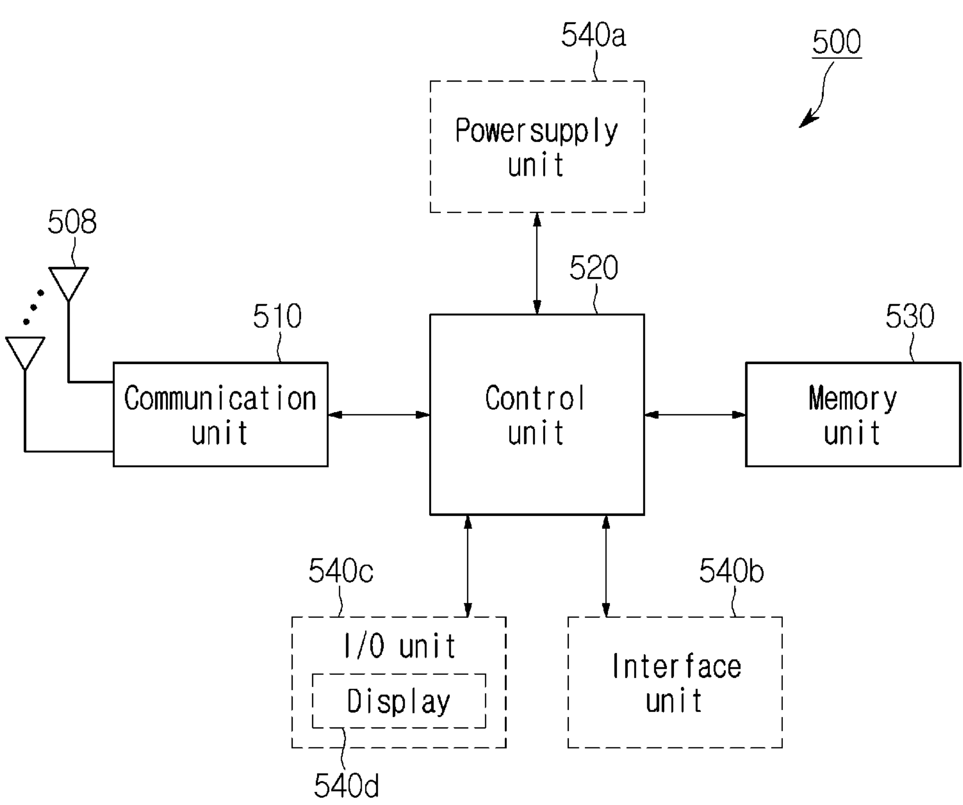
FIG. 35 illustrates an example of a portable device according to an embodiment of the present disclosure.

FIG. 35 illustrates a hand-held device applicable to the present disclosure. FIG. 35 exemplifies a hand-held device applicable to the present disclosure. The hand-held device may include a smartphone, a smart pad, a wearable device (e.g., a smart watch or smart glasses), and a hand-held computer (e.g., a laptop, etc.). The embodiment of FIG. 35 may be combined with various embodiments of the present disclosure.

Referring to FIG. 35, the hand-held device 500 may include an antenna unit (antenna) 508, a communication unit (transceiver) 510, a control unit (controller) 520, a memory unit (memory) 530, a power supply unit (power supply) 540*a*, an interface unit (interface) 540*b*, and an input/output unit 540*c*. An antenna unit (antenna) 508 may be part of the communication unit 510. The blocks 510 to 530/440*a* to 540*c* may correspond to the blocks 310 to 330/340 of FIG. 34, respectively, and duplicate descriptions are omitted.

The communication unit 510 may transmit and receive signals and the control unit 520 may control the hand-held device 500, and the memory unit 530 may store data and so on. The power supply unit 540*a* may supply power to the hand-held device 500 and include a wired/wireless charging circuit, a battery, etc. The interface unit 540*b* may support connection between the hand-held device 500 and another external device. The interface unit 540*b* may include various ports (e.g., an audio input/output port and a video input/output port) for connection with the external device. The input/output unit 540*c* may receive or output video information/signals, audio information/signals, data and/or user input information. The input/output unit 540*c* may include a camera, a microphone, a user input unit, a display 540*d*, a speaker and/or a haptic module.

For example, in case of data communication, the input/output unit 540*c* may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 540*c* in various forms (e.g., text, voice, image, video and haptic).

Figure 36:
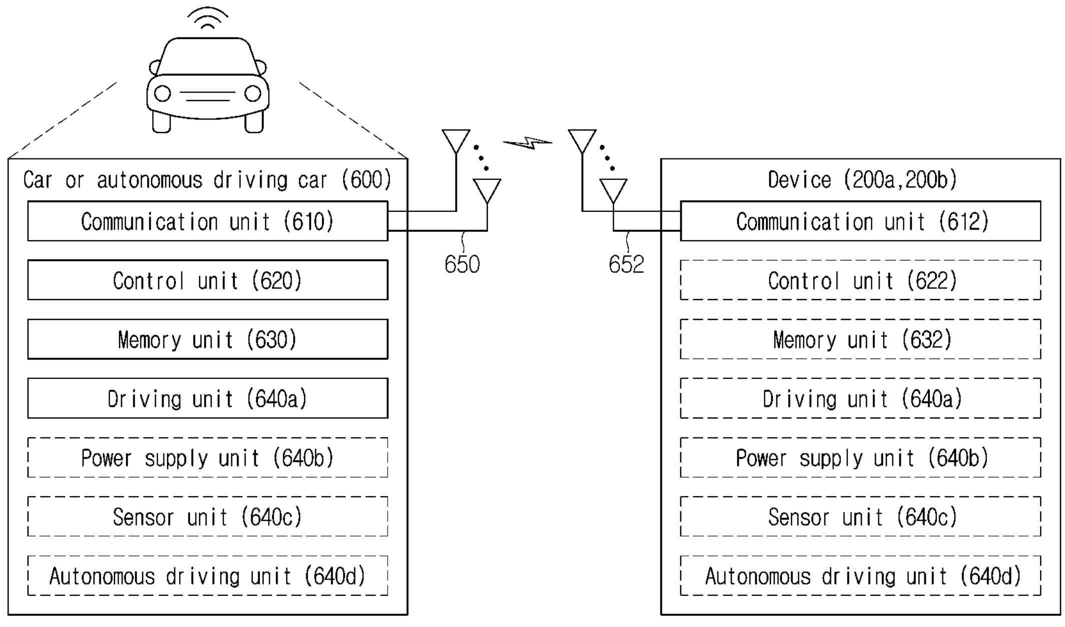
FIG. 36 illustrates an example of a vehicle or an autonomous vehicle according to an embodiment of the present disclosure.

FIG. 36 illustrates a car or an autonomous vehicle applicable to the present disclosure. FIG. 36 exemplifies a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited. The embodiment of FIG. 36 may be combined with various embodiments of the present disclosure.

Referring to FIG. 36, the car or autonomous driving car 600 may include an antenna unit (antenna) 608, a communication unit (transceiver) 610, a control unit (controller) 620, a driving unit 640*a*, a power supply unit (power supply) 640*b*, a sensor unit 640*c*, and an autonomous driving unit 640*d*. The antenna unit 650 may be configured as part of the communication unit 610. The blocks 610/630/640*a* to 640*d* correspond to the blocks 510/530/540 of FIG. 35, and duplicate descriptions are omitted.

The communication unit 610 may transmit and receive signals (e.g., data, control signals, etc.) to and from external devices such as another vehicle, a base station (e.g., a base station, a road side unit, etc.), and a server. The control unit 620 may control the elements of the car or autonomous driving car 600 to perform various operations. The control unit 620 may include an electronic control unit (ECU). The driving unit 640*a* may drive the car or autonomous driving car 600 on the ground. The driving unit 640*a* may include an engine, a motor, a power train, wheels, a brake, a steering device, etc. The power supply unit 640*b* may supply power to the car or autonomous driving car 600, and include a wired/wireless charging circuit, a battery, etc. The sensor unit 640*c* may obtain a vehicle state, surrounding environment information, user information, etc. The sensor unit 640*c* may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 640*d* may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 610 may receive map data, traffic information data, etc. from an external server. The autonomous driving unit 640*d* may generate an autonomous driving route and a driving plan based on the acquired data. The control unit 620 may control the driving unit 640*a* (e.g., speed/direction control) such that the car or autonomous driving car 600 moves along the autonomous driving route according to the driving plane. During autonomous driving, the communication unit 610 may aperiodically/periodically acquire latest traffic information data from an external server and acquire surrounding traffic information data from neighboring cars. In addition, during autonomous driving, the sensor unit 640*c* may acquire a vehicle state and surrounding environment information. The autonomous driving unit 640*d* may update the autonomous driving route and the driving plan based on newly acquired data/information. The communication unit 610 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

Since examples of the above-described proposed method may also be included as one of the implementation methods of the present disclosure, it is obvious that they may be regarded as a kind of proposed method. In addition, the above-described proposed methods may be implemented independently, or may be implemented in the form of a combination (or merge) of some of the proposed methods. The rule can be defined so that the information on whether the proposed methods are applied (or information on the rules of the proposed methods) is notified by the base station to the terminal through a predefined signal (eg, a physical layer signal or a higher layer signal).

The present disclosure may be embodied in other specific forms without departing from the technical ideas and essential characteristics described in the present disclosure. Accordingly, the above detailed description should not be construed as restrictive in all respects but as exemplary. The scope of the present disclosure should be determined by a reasonable interpretation of the appended claims, and all modifications within the equivalent scope of the present disclosure are included in the scope of the present disclosure. In addition, claims that are not explicitly cited in the claims may be combined to form an embodiment or may be included as a new claim by amendment after filing.

What is claimed is:

1. A method performed by a reception terminal, the method comprising:

receiving downlink control information (DCI) including information related to sidelink;

performing synchronization based on sidelink synchronization signal (SLSS), wherein the SLSS includes primary sidelink synchronization signal (PSSS) and secondary sidelink synchronization signal (SSSS);

determining one or more resource pools, wherein the one or more resource pools are configured by a base station based on sidelink resource allocation mode 1, and the one or more resource pools are determined by a user equipment (UE) based on sidelink resource allocation mode 2, wherein a resource pool includes a plurality of contiguous frequency resources in a frequency domain, and a set of slots in a time domain;

receiving first data from a first transmission terminal and determining a hybrid automatic repeat request (HARQ) feedback transmission time point for the first data;

receiving second data from a second transmission terminal and determining a HARQ feedback transmission time point for the second data;

based on the HARQ feedback transmission time point for the first data and the HARQ feedback transmission time point for the second data being identical with each other, modifying the HARQ feedback transmission time point for the first data;

transmitting, to the first transmission terminal, a negotiation message for indicating the HARQ feedback transmission time point modification; and transmitting a HARQ feedback based on the modified HARQ feedback transmission time point, wherein the reception terminal receives first sidelink control information (SCI) together with the first data from the first transmission terminal and receives second SCI together with the second data from the second transmission terminal, and wherein a negotiation flag field is included in each of the first SCI and the second SCI.

2. The method of claim 1, wherein the first transmission terminal is aligned with the reception a reception terminal by a first beam and the second transmission terminal is aligned with the reception terminal by a second beam, and wherein the HARQ feedback transmission time points for the first transmission terminal and the second transmission terminal respectively are determined based on resource pool information and physical sidelink feedback channel (PSFCH) configuration information of a radio resource control (RRC) layer setting.

3. The method of claim 1, wherein, based on the negotiation flag field being a first value, the negotiation flag field indicates that HARQ feedback transmission time point modification is possible, and wherein, based on the negotiation flag field being a second value, the negotiation flag field indicates that HARQ feedback transmission time point modification is impossible.

4. The method of claim 3, wherein the negotiation flag field of the first SCI is set to the first value, and the negotiation flag field of the second SCI is set to the second value.

5. The method of claim 3, wherein, based on both the negotiation flag field of the first SCI and the negotiation flag field of the second SCI being set to the second value, the reception terminal modifies the HARQ feedback transmission time point for the first data with a lower priority based on a priority order for the first data and the second data.

6. The method of claim 1, wherein the reception terminal transmits the negotiation message through a resource that is preconfigured based on a RRC layer setting, and wherein the negotiation message is configured to be 1-bit information indicating whether or not the HARQ feedback transmission time point is modified.

7. The method of claim 6, wherein, based on the negotiation message indicating the HARQ feedback transmission time point modification for the first data, the HARQ feedback transmission time point for the first data is transmitted one slot before a determined HARQ feedback transmission time point.

8. A method performed by a transmission terminal, the method comprising:

receiving downlink control information (DCI) including information related to sidelink;

performing synchronization based on sidelink synchronization signal (SLSS), wherein the SLSS includes primary sidelink synchronization signal (PSSS) and secondary sidelink synchronization signal (SSSS);

determining one or more resource pools, wherein the one or more resource pools are configured by a base station based on sidelink resource allocation mode 1, and the one or more resource pools are determined by a user equipment (UE) based on sidelink resource allocation mode 2, wherein a resource pool includes a plurality of contiguous frequency resources in a frequency domain, and a set of slots in a time domain;

transmitting first data to a reception terminal;

receiving, from the reception terminal, a negotiation message for indicating that a HARQ feedback transmission time point for the first data is modified; and receiving, from the reception terminal, HARQ feedback at a time point modified based on the negotiation message, wherein the reception terminal receives second data from another transmission terminal, wherein first sidelink control information (SCI) is transmitted together with the first data, and wherein a negotiation flag field is included in the first SCI.

9. The method of claim 8, wherein the transmission terminal is aligned with the reception terminal by a first beam, wherein the reception terminal receives the second data from another transmission terminal that is aligned by a second beam, and wherein the HARQ feedback transmission time point of the transmission terminal is determined based on resource pool information and PSFCH configuration information of a RRC layer setting.

10. The method of claim 8, wherein, based on the negotiation flag field being a first value, the negotiation flag field indicates that HARQ feedback transmission time point modification is possible, and wherein, based on the negotiation flag field being a second value, the negotiation flag field indicates that HARQ feedback transmission time point modification is impossible.

11. The method of claim 10, wherein the negotiation flag field of the first SCI is set to the first value.

12. The method of claim 8, wherein the transmission terminal receives the negotiation message through a resource that is preconfigured based on a RRC layer setting, and wherein the negotiation message is configured to be 1-bit information indicating whether or not the HARQ feedback transmission time point is modified.

13. The method of claim 12, wherein, based on the negotiation message indicating the HARQ feedback transmission time point modification for the first data, the HARQ feedback transmission time point for the first data is transmitted one slot before a determined HARQ feedback transmission time point.

14. A reception terminal comprising:

at least one processor; and at least one memory storing instructions thereon that, when executed by the at least one processor, cause the terminal to perform at least:

receive downlink control information (DCI) including information related to sidelink, perform synchronization based on sidelink synchronization signal (SLSS), wherein the SLSS includes primary sidelink synchronization signal (PSSS) and secondary sidelink synchronization signal (SSSS), determine one or more resource pools, wherein the one or more resource pools are configured by a base station based on sidelink resource allocation mode 1, and the one or more resource pools are determined by the terminal based on sidelink resource allocation mode 2, wherein a resource pool includes a plurality of contiguous frequency resources in a frequency domain, and a set of slots in a time domain, receive first data from a first transmission terminal and determine a HARQ feedback transmission time point for the first data, receive second data from a second transmission terminal and determine a HARQ feedback transmission time point for the second data, based on the HARQ feedback transmission time point for the first data and the HARQ feedback transmission time point for the second data being identical with each other, modify the HARQ feedback transmission time point for the first data, transmit, to the first transmission terminal, a negotiation message for indicating the HARQ feedback transmission time point modification, and transmit, to the first transmission terminal, a HARQ feedback based on the modified HARQ feedback transmission time point, wherein the reception terminal receives first sidelink control information (SCI) together with the first data from the first transmission terminal and receives second SCI together with the second data from the second transmission terminal, and wherein a negotiation flag field is included in each of the first SCI and the second SCI.

* * * * *